US007983885B2

(12) United States Patent
Suarez-Rivera et al.

(10) Patent No.: US 7,983,885 B2
(45) Date of Patent: Jul. 19, 2011

(54) METHOD AND APPARATUS FOR MULTI-DIMENSIONAL DATA ANALYSIS TO IDENTIFY ROCK HETEROGENEITY

(75) Inventors: Roberto Suarez-Rivera, Salt Lake City, UT (US); David A. Handwerger, Salt Lake City, UT (US); Timothy L. Sodergren, Murray, UT (US)

(73) Assignee: TerraTek, Inc., Salt Lake City, UT (US)

( * ) Notice: Subject to any disclaimer, the term of this patent is extended or adjusted under 35 U.S.C. 154(b) by 551 days.

(21) Appl. No.: 11/617,993

(22) Filed: Dec. 29, 2006

(65) Prior Publication Data

US 2008/0162098 A1 Jul. 3, 2008

(51) Int. Cl.
*G06F 7/48* (2006.01)
*G01V 1/40* (2006.01)
*G01V 3/18* (2006.01)
*G01V 5/04* (2006.01)
*G01V 9/00* (2006.01)

(52) U.S. Cl. ............................................. 703/10; 702/6
(58) Field of Classification Search ........ 702/6; 166/66; 703/10
See application file for complete search history.

(56) References Cited

U.S. PATENT DOCUMENTS

| 5,105,894 | A | * | 4/1992 | Enderlin | 175/44 |
| 5,444,619 | A | * | 8/1995 | Hoskins et al. | 702/13 |
| 5,766,953 | A | * | 6/1998 | Kennedy | 436/31 |
| 6,067,340 | A | | 5/2000 | Eppstein et al. | |
| 6,070,125 | A | * | 5/2000 | Murphy et al. | 702/11 |
| 6,295,504 | B1 | * | 9/2001 | Ye et al. | 702/7 |
| 2005/0171697 | A1 | | 8/2005 | Heliot et al. | |
| 2005/0256643 | A1 | * | 11/2005 | Boitnott | 702/6 |
| 2007/0213935 | A1 | * | 9/2007 | Fagnou et al. | 702/6 |
| 2007/0277115 | A1 | * | 11/2007 | Glinsky et al. | 715/771 |

FOREIGN PATENT DOCUMENTS

| EP | 1160586 A2 | 12/2001 |
| GB | 2215891 A | 9/1989 |
| WO | 2004063769 A2 | 7/2004 |

OTHER PUBLICATIONS

John H. Doventon, "Geologic Log Analysis Using Computer Methods", The American Association of Petroleum Geologists, 1994, Chapter 4.*
Masoud Nikravesh, Roy D. Adams, Raymond A. Levey, "Soft Computing: tools for intelligent reservoir characterization (IRESC) and optium well placement (OWP)", Elseiver, Journal of Petroleum Science and Engineering 29, 2001, p. 239-262.*

(Continued)

*Primary Examiner* — David Silver
*Assistant Examiner* — Angel J Calle
(74) *Attorney, Agent, or Firm* — Robert P. Lord; Duke W. Yee

(57) ABSTRACT

A method, apparatus and computer usable program code for identifying regions in the ground at a well site. Continuous data is received from the well site; reducing redundancies in the continuous data received from the well site to form processed data. Cluster analysis is performed using the processed data to form a set of cluster units, wherein the set of cluster units include different types of cluster units that identify differences between regions in the ground at the well site. Properties are identified for each type of cluster unit in the set of cluster units to form a model for the well site.

82 Claims, 21 Drawing Sheets

OTHER PUBLICATIONS

Hendrik Paasche, Jens Tronicke, Klaus Holliger, Alan G. Green, and Hansruedi Maurer, "Integration of diverse physical-property models: Subsurface zonation and petrophysical parameter estimation based on fuzzy c-means cluster analyses", Jun. 2006.*

J. R. Scheelvel, and K. Payrazyan, "Principal Component Analysis Applied to 3D Seismic Data for Reservoir Property Estimation", 1999.*

John H. Doveton, "Geologic Log Analysis Using Computer Methods", 1994.*

Jerry R. Schoenleber, "New Jersey Department of Environmental Protection Field Sampling Procedures Manual", Aug. 2005.*

Patrick W. M. Corbett, "Petrophysical sampling strategy for a model-dominated user group using an experimental design checklist approach", SCA 2001.*

Bucker et al., "Analysis of Downhole Logging Data from CRP-2/2A, Victoria Land Basin, Antarctica: a multivariate Statistical Approach", Terra Antarctica, v. 7, No. 3, Studies from the Cape Roberts Project, Ross Sea, Antarctica—Scientific Report of CRP-2/2A, 2000, pp. 299-310.

Doveton, "Geologic Log Analysis Using Computer Methods", AAPG Computer Applications in Geology, No. 2, Chapter 4, The American Associated of Petroleum Geologists, Tulsa, Oklahoma, 1994pp. 65-95.

"Analysis Method for Lateral (basin-scale) Heterogeneity of Tight Gas Reservoir Quality Using Log Measurements", TerraTek, Fast-Track, pp. 1-3.

"Sidewall Plug Selection for Reservoir Analysis Based on Sidewall Plugs", TerraTek, pp. 1-2.

"Tight Rock Analysis Pre-Evaluation of Log Data for Core Interval Selection", TerraTek, (Cluster), pp. 1-2.

"Tight Rock Analysis of Gas Shale Reservoirs for Reservoir Characterization and Completion Design", TerraTek, pp. 1-2.

Scheevel, J.R. et al., "Principal Component Analysis to 3D Seismic Data for Reservoir Property Estimation," Society of Petroleum Engineers, SPE Annual Technical Conference and Exhibition, Oct. 3-6, 1999, pp. 1-15, SPE 56734, Houston, Texas USA.

Justice J.H. et al., "Multidimensional Attribute Analysis and Pattern Recognition for Seismic Interpretation," Pattern Recognition, 1985, pp. 391-407, vol. 18, No. 6, Pergamon Press Ltd., Great Britain.

Robinson, Mark C. et al., "Cluster Analysis of Geophysical Well-Log Data in the North Riley Unit, Gaines County, Texas," SEG Expanded Abstracts, 1989, pp. 51-54.

Dzwinel, Witold et al., "Multi-resolution clustering analysis and 3-D visualization of multitudinous synthetic earthquakes," Visual Geosciences, Feb. 27, 2003, pp. 1-32, XP-002554296, Springer-Verlag.

* cited by examiner

METHOD AND APPARATUS FOR MULTI-DIMENSIONAL DATA ANALYSIS TO IDENTIFY ROCK HETEROGENEITY

BACKGROUND OF THE INVENTION

1. Field of the Invention

The present invention relates generally to an improved data processing system and in particular, to a method and apparatus for analyzing data from a well site. Still more particularly, the present invention relates to a computer implemented method, apparatus, and computer usable program code for analyzing data about a formation in the earth obtained from a well site to predict properties for the formation.

2. Background of the Invention

In the production life cycle of natural resources, such as oil and gas, these types of resources are extracted from reservoir fields in geological formations.

Different stages in this life cycle include exploration, appraisal, reservoir development, production decline, and abandonment of the reservoir. In these different phases, decisions are made to properly allocate resources to assure that the reservoir meets its production potential. In the early stages of this cycle, the distribution of internal properties within the reservoir is almost unknown. As development of the reservoir continues, different types of data regarding the reservoir are collected. This data includes, for example, seismic data, well logs, and production data. The collected information is combined to construct an understanding of the distribution of reservoir properties in the formation.

This understanding of the distribution of reservoir changes as production and the data changes. In analyzing this data, a number of different software packages have been developed. For example, Petrel is a software solution that provides different tools from seismic interpretation to simulation in a single application. Petrel is a product of Schlumberger Technology Corporation. An example of another software package used to analyze data about formations in the earth is GeoFrame®. This software package is available from Schlumberger Technology Corporation and provides an interrogated reservoir characterization system used to outline and manage everyday work flow and provide for detail analysis of reservoirs.

However, the approaches to analyzing data from well sites that are available today have some important disadvantages for depicting formation of heterogeneities. The different embodiments recognize that these currently available techniques are not designed to facilitate the integration of data from different sources because of heterogeneity in the formations. For example, a program may allow for analysis and interpretation of seismic data while another program may allow for the analysis of porosity measurements. The same program may even include modules for analyzing data from different sources. The different embodiments recognize that these currently available techniques are unable to integrate data from different sources because of heterogeneity of the formations in the ground.

SUMMARY OF THE INVENTION

In view of the above problems, an object of the present invention is to provide methods, apparatuses and systems for multi-dimensional data analysis to identify heterogeneity in formations or regions in the ground while eliminating or minimizing the impact of the problems and limitations described.

The present invention includes a computer implemented method for identifying regions in the ground at a well site. The steps in the method include receiving continuous data from the well site; reducing redundancies in the continuous data received from the well site to form processed data; performing cluster analysis using the processed data to form a set of cluster units, wherein the set of cluster units include different types of cluster units that identify differences between regions in the ground at the well site; and identifying properties for each type of cluster unit in the set of cluster units to form a model for the well site. The performing step may include selecting a number of cluster groups for the processed data; grouping the processed data into the number of cluster groups to form grouped data; selecting a set of centroid locations for the grouped data in the number of cluster groups; evaluating distances between the set of centroid locations and the grouped data; and selectively changing the set of centroid locations to minimize the distances between the set of centroid locations and the grouped data in response to evaluating the distances. The identifying step may include identifying properties for each cluster unit in the set of cluster units in the model using multi-dimensional data from the well site. The multi-dimensional data comprises at least one of continuous well site data, continuous laboratory data, discrete well site data, and discrete laboratory data. The method also may include steps for obtaining additional multi-dimensional data from a target well and performing cluster tagging to create a second model for the target well using the additional multi-dimensional data, the model with identified properties, and the multi-dimensional data for the well site.

The present invention includes a method for multi-dimensional data analysis for a well site. The steps in the method include receiving multi-dimensional data from the well site and performing cluster analysis using the multi-dimensional data to form a set of cluster units in response to receiving the multi-dimensional data. The different types of cluster units within the set of cluster units identify differences between regions in the ground at the well site. The method also may include identifying each cluster unit in the set of cluster units using the multi-dimensional data from the well site. The steps in the method also may include presenting the set of cluster units in a color-coded display. The multi-dimensional data comprises continuous well site data, continuous laboratory data, discrete well site data, and discrete laboratory data. The method also may include a step for refining the multi-dimensional data received from the well site that is performed before the performing step. The steps in the method also may include identifying a minimum number of data sets in the multi-dimensional data. The minimum number of data sets reduces redundancy in the multi-dimensional data used in performing cluster analysis. The performing step may include selecting a number of cluster groups for the multi-dimensional data; grouping the multi-dimensional data into the number of cluster groups to form grouped data; selecting a set of centroid locations for the grouped data in the number of cluster groups; evaluating distances between the set of centroid locations and the grouped data; and selectively changing the set of centroid locations to minimize the distances between the set of centroid locations and the grouped data in response to evaluating the distances. The steps of the method also may include repeating the evaluating and selectively changing steps until a threshold is met to adequately represent variability of input variables in the grouped data. In these embodiments, the cluster analysis is performed using a K-Means algorithm. The steps of the method also may include identifying properties for each cluster unit in the set of cluster units. In identifying properties for each cluster unit in the set of cluster units, the step may include identifying properties for each cluster unit in the set of cluster units using the multi-dimensional data from the well site. In identifying properties for each cluster unit in the set of cluster units, the step may include obtaining discrete well site data for each type of cluster unit in the set of cluster units and identifying the properties for the each cluster unit in the set of cluster units using the discrete well site data. The multi-dimensional data may be continuous data and the step of identifying properties for the set of cluster units may include identifying the properties for the each cluster unit in the set of cluster units using the continuous data. The steps in the method also may include matching the multi-dimensional data to the different types of cluster units in the set of cluster units. The well site may be a reference well site and the steps of the method may include correlating the multi-dimensional data matched to the different types of cluster units in the set of cluster units for the reference well site to additional multi-dimensional data for a target well site. A second model containing cluster units for the target well site is created. The method also may include relating all of the multi-dimensional data to a reference depth scale. The multi-dimensional data may be continuous data and the method may be a computer implemented method. Further, the steps of the method may include generating decisions regarding operation of the well site using the properties identified for the each cluster unit in the set of cluster units. The multi-dimensional data includes a sidewall plug and the steps include obtaining a first core from the sidewall plug at a first orientation with respect to an axis for the sidewall plug and obtaining a second core from the sidewall plug at a second orientation with respect to an axis for the sidewall plug. The steps also may include obtaining a third core from the sidewall plug at a third orientation with respect to an axis for the sidewall plug.

The present invention also includes a method for obtaining samples from a sidewall plug. The steps in the method includes identifying different orientations with respect to an axis through the sidewall plug and obtaining cores from the sidewall plug along the plurality of different orientations. The number of different orientations and the number of cores may be three.

The present invention includes a method for well site analysis. The steps in this method include receiving a request from a client to provide an analysis of a well site, wherein the request includes multi-dimensional data obtained from the well site; performing cluster analysis using the multi-dimensional data to form a set of cluster units in response to receiving the request, wherein the set of cluster units identify differences between regions in the ground at the well site; and sending results based on the cluster analysis to the client. The client uses the results to perform actions at the well site. The results may take the form of a graphical model of the ground at the well site, wherein the model includes the set of clusters. The results also may be instructions identifying the actions.

The present invention includes an apparatus for identifying regions in the ground at a well site. The apparatus includes receiving means for receiving continuous data from the well site; reducing means for reducing redundancies in the continuous data received from the well site to form processed data; performing means for performing cluster analysis using the processed data to form a set of cluster units, wherein the set of cluster units include different types of cluster units that identify differences between regions in the ground at the well site; and identifying means for identifying properties for each type of cluster unit in the set of cluster units to form a model for the well site. The performing means may include first selecting means for selecting a number of cluster groups for the processed data; grouping means for grouping the processed data into the number of cluster groups to form grouped data; second selecting means for selecting a set of centroid locations for the grouped data in the number of cluster groups; evaluating means for evaluating distances between the set of centroid locations and the grouped data; and changing means for selectively changing the set of centroid locations to minimize the distances between the set of centroid locations and the grouped data in response to evaluating the distances. The identifying means may include means for identifying properties for each cluster unit in the set of cluster units in the model using multi-dimensional data from the well site. The multi-dimensional data comprises at least one of continuous well site data, continuous laboratory data, discrete well site data, and discrete laboratory data. The apparatus also may include obtaining means for obtaining additional multi-dimensional data from a target well and performing means for performing cluster tagging to create a second model for the target well using the additional multi-dimensional data, the model with identified properties, and the multi-dimensional data for the well site.

The present invention includes an apparatus for multi-dimensional data analysis for a well site. The apparatus includes receiving means for receiving multi-dimensional data from the well site and performing means for performing cluster analysis using the multi-dimensional data to form a set of cluster units in response to receiving the multi-dimensional data. The different types of cluster units within the set of cluster units identify differences between regions in the ground at the well site. The apparatus also may include identifying means for identifying each cluster unit in the set of cluster units using the multi-dimensional data from the well site. The apparatus may include presenting means for presenting the set of cluster units in a color-coded display. The multi-dimensional data comprises continuous well site data, continuous laboratory data, discrete well site data, and discrete laboratory data. The apparatus may include refining means for refining the multi-dimensional data received from the well site that is executed before the performing means. The apparatus also may include identifying means for identifying a minimum number of data sets in the multi-dimensional data. The minimum number of data sets reduces redundancy in the multi-dimensional data used in performing cluster analysis. The performing means may include selecting means for selecting a number of cluster groups for the multi-dimensional data; grouping means for grouping the multi-dimensional data into the number of cluster groups to form grouped data; second selecting means for selecting a set of centroid locations for the grouped data in the number of cluster groups; evaluating means for evaluating distances between the set of centroid locations and the grouped data; and changing means for selectively changing the set of centroid locations to minimize the distances between the set of centroid locations and the grouped data in response to evaluating the distances. The apparatus also may include repeating means for repeating execution of the evaluating means and the changing means until a threshold is met to adequately represent variability of input variables in the grouped data. In these embodiments, the cluster analysis is performed using a K-Means algorithm. The apparatus also may include identifying means for identifying properties for cluster unit in the set of cluster units. In identifying properties for each cluster unit in the set of cluster units, the identifying means may include means for identifying properties for each cluster unit in the set of cluster units using the multi-dimensional data from the well site. In identifying properties for each cluster unit in the set of cluster units, the identifying means may include obtaining means for obtaining discrete well site data for each type of cluster unit in the set of cluster units and identifying means for identifying the properties for the each cluster unit in the set of cluster units using the discrete well site data. The multi-dimensional data may be continuous data and the identifying means for identifying properties for the set of cluster units may include means for identifying the properties for the each cluster unit in the set of cluster units using the continuous data. The apparatus also may include matching means for matching the multi-dimensional data to the different types of cluster units in the set of cluster units. The well site may be a reference well site and the apparatus may include correlating means for correlating the multi-dimensional data matched to the different types of cluster units in the set of cluster units for the reference well site to additional multi-dimensional data for a target well site. A second model containing cluster units for the target well site is created. The apparatus also may include relating means for relating all of the multi-dimensional data to a reference depth scale. The multi-dimensional data may be continuous data and the method may be a computer implemented method. Further, the apparatus may include generating means for generating decisions regarding operation of the well site using the properties identified for the each cluster unit in the set of cluster units.

The present invention includes a computer program product having a computer usable medium including computer usable program code for identifying regions in a ground at a well site. The computer program product includes computer usable program code for receiving continuous data from the well site; computer usable program code for reducing redundancies in the continuous data received from the well site to form processed data; computer usable program code for performing cluster analysis using the processed data to form a set of cluster units, wherein the set of cluster units include different types of cluster units that identify differences between regions in the ground at the well site; and computer usable program code for identifying properties for each type of cluster unit in the set of cluster units to form a model for the well site. The computer usable program code for performing cluster analysis using the processed data to form a set of cluster units may include computer usable program code for selecting a number of cluster groups for the processed data; computer usable program code for grouping the processed data into the number of cluster groups to form grouped data; computer usable program code for selecting a set of centroid locations for the grouped data in the number of cluster groups; computer usable program code for evaluating distances between the set of centroid locations and the grouped data; and computer usable program code for selectively changing the set of centroid locations to minimize the distances between the set of centroid locations and the grouped data in response to evaluating the distances. The computer usable program code for identifying properties for each type of cluster unit in the set of cluster units to form a model for the well site may include computer usable program code for identifying properties for each cluster unit in the set of cluster units in the model using multi-dimensional data from the well site. The multi-dimensional data comprises at least one of continuous well site data, continuous laboratory data, discrete well site data, and discrete laboratory data. The computer program product also may include computer usable program code for obtaining additional multi-dimensional data from a target well and computer usable program code for performing cluster tagging to create a second model for the target well using the additional multi-dimensional data, the model with identified properties, and the multi-dimensional data for the well site.

The present invention includes a computer program product having a computer usable medium including computer usable program code for multi-dimensional data analysis for a well site. The computer program product includes computer usable program code for receiving multi-dimensional data from the well site and computer usable program code for performing cluster analysis using the multi-dimensional data to form a set of cluster units in response to receiving the multi-dimensional data. The different types of cluster units within the set of cluster units identify differences between regions in the ground at the well site. The computer program product also may include computer usable program code for identifying each cluster unit in the set of cluster units using the multi-dimensional data from the well site. The computer program product may include computer usable program code for presenting the set of cluster units in a color-coded display. The multi-dimensional data comprises continuous well site data, continuous laboratory data, discrete well site data, and discrete laboratory data. The computer program product also includes computer usable program code for refining the multi-dimensional data received from the well site that is executed before executing the computer usable program code for performing cluster analysis using the multi-dimensional data to form cluster units. The computer program product also may include computer usable program code for identifying a minimum number of data sets in the multi-dimensional data. The minimum number of data sets reduces redundancy in the multi-dimensional data used in performing cluster analysis. The computer usable program code for performing cluster analysis using the multi-dimensional data to form cluster units may include computer usable program code for selecting a number of cluster groups for the multi-dimensional data; computer usable program code for grouping the multi-dimensional data into the number of cluster groups to form grouped data; computer usable program code for selecting a set of centroid locations for the grouped data in the number of cluster groups; computer usable program code for evaluating distances between the set of centroid locations and the grouped data; and computer usable program code for selectively changing the set of centroid locations to minimize the distances between the set of centroid locations and the grouped data in response to evaluating the distances. The computer program product also may include computer usable program code for repeating execution of the computer usable program code for evaluating distances between the set of centroid locations and the grouped data and computer usable program code for selectively changing the set of centroid locations to minimize the distances between the set of centroid locations and the grouped data in response to evaluating the distances until a threshold is met to adequately represent variability of input variables in the grouped data. In these embodiments, the cluster analysis is performed using a K-Means algorithm. The computer program product also may include computer usable program code for identifying properties for each cluster unit in the set of cluster units. In identifying properties for each cluster unit in the set of cluster units, the computer usable program code for identifying properties for each cluster unit in the set of cluster units may include computer usable program code for identifying properties for each cluster unit in the set of cluster units using the multi-dimensional data from the well site. In identifying properties for each cluster unit in the set of cluster units, the computer usable program code identifying properties for each cluster unit in the set of cluster units may include computer usable program code for obtaining discrete well site data for each type of cluster unit in the set of cluster units and computer usable program code for identifying the properties for the each cluster unit in the set of cluster units using the discrete well site data. The multi-dimensional data may be continuous data and the computer usable program code for identifying properties for the set of cluster units may include computer usable program code for identifying the properties for the each cluster unit in the set of cluster units using the continuous data. The computer program products also may include computer usable program code for matching the multi-dimensional data to the different types of cluster units in the set of cluster units. The well site may be a reference well site and the computer program products may include computer usable program code for correlating the multi-dimensional data matched to the different types of cluster units in the set of cluster units for the reference well site to additional multi-dimensional data for a target well site. A second model containing cluster units for the target well site is created. The computer program product also may include computer usable program code for relating all of the multi-dimensional data to a reference depth scale. The multi-dimensional data may be continuous data. Further, the computer program product may include computer usable program code for generating decisions regarding operation of the well site using the properties identified for the each cluster unit in the set of cluster units.

The present invention includes a data processing system having a bus; a communications unit connected to the bus; a storage device connected to the bus, wherein the storage device includes computer usable program code; and a processor unit connected to the bus. The processor unit executes the computer usable program code to receive continuous data from the well site; reduce redundancies in the continuous data received from the well site to form processed data; perform cluster analysis using the processed data to form a set of cluster units, wherein the set of cluster units include different types of cluster units that identify differences between regions in the ground at the well site; and identify properties for each type of cluster unit in the set of cluster units to form a model for the well site. In executing the computer usable program code to perform cluster analysis using the processed data to form a set of cluster units, the processor unit may execute the computer usable program code to select a number of cluster groups for the processed data; group the processed data into the number of cluster groups to form grouped data; select a set of centroid locations for the grouped data in the number of cluster groups; evaluate distances between the set of centroid locations and the grouped data; and selectively change the set of centroid locations to minimize the distances between the set of centroid locations and the grouped data in response to evaluating the distances. In executing the computer usable program code for identifying properties for each type of cluster unit in the set of cluster units to form a model for the well site, the processor unit may execute the computer usable program code to identify properties for each cluster unit in the set of cluster units in the model using multi-dimensional data from the well site. The multi-dimensional data comprises at least one of continuous well site data, continuous laboratory data, discrete well site data, and discrete laboratory data. The processor unit may further execute the computer useable program code to obtain additional multi-dimensional data from a target well and perform cluster tagging to create a second model for the target well using the additional multi-dimensional data, the model with identified properties, and the multi-dimensional data for the well site.

The present invention includes a data processing system having a bus; a communications unit connected to the bus; a storage device connected to the bus, wherein the storage device includes computer usable program code; and a processor unit connected to the bus. The processor unit executes the computer usable program code to receive multi-dimensional data from the well site and to perform cluster analysis using the multi-dimensional data to form a set of cluster units in response to receiving the multi-dimensional data. The different types of cluster units within the set of cluster units identify differences between regions in the ground at the well site. The processor unit also may execute the computer usable program code to identify each cluster unit in the set of cluster units using the multi-dimensional data from the well site. The processor unit also may execute the computer usable program code to present the set of cluster units in a color-coded display. The multi-dimensional data comprises continuous well site data, continuous laboratory data, discrete well site data, and discrete laboratory data. The processor unit also may execute the computer usable program code to refine the multi-dimensional data received from the well site that is executed before executing the computer usable program code to perform cluster analysis using the multi-dimensional data to form cluster units. The processor unit also may execute the computer usable program code to identify a minimum number of data sets in the multi-dimensional data. The minimum number of data sets reduces redundancy in the multi-dimensional data used in performing cluster analysis. In executing the computer usable program code for performing cluster analysis using the multi-dimensional data to form cluster units, the processor unit may execute the computer usable program code to select a number of cluster groups for the multi-dimensional data; group the multi-dimensional data into the number of cluster groups to form grouped data; select a set of centroid locations for the grouped data in the number of cluster groups; evaluate distances between the set of centroid locations and the grouped data; and selectively change the set of centroid locations to minimize the distances between the set of centroid locations and the grouped data in response to evaluating the distances. The processor unit also may execute the computer usable program code to repeat evaluating distances between the set of centroid locations and the grouped data and selectively changing the set of centroid locations to minimize the distances between the set of centroid locations and the grouped data in response to evaluating the distances until a threshold is met to adequately represent variability of input variables in the grouped data. In these embodiments, the cluster analysis is performed using a K-Means algorithm. The processor unit also may execute the computer usable program code to identify properties for each cluster unit in the set of cluster units. In identifying properties for each cluster unit in the set of cluster units, the processor unit also may execute the computer usable program code to identify properties for each cluster unit in the set of cluster units using the multi-dimensional data from the well site. In identifying properties for each cluster unit in the set of cluster units, the processor unit also may execute the computer usable program code to obtain discrete well site data for each type of cluster unit in the set of cluster units and identify the properties for the each cluster unit in the set of cluster units using the discrete well site data. The multi-dimensional data may be continuous data and in executing the computer usable program code to identify properties for the set of cluster units, the processor unit may execute the computer usable program code to identify the properties for the each cluster unit in the set of cluster units using the continuous data. The processor unit also may execute the computer usable program code to match the multi-dimensional data to the different types of cluster units in the set of cluster units. The well site may be a reference well site and the processor unit may execute the computer usable program code to correlate the multi-dimensional data matched to the different types of cluster units in the set of cluster units for the reference well site to additional multi-dimensional data for a target well site. A second model containing cluster units for the target well site is created. The processor unit also may execute the computer usable program code to relate all of the multi-dimensional data to a reference depth scale. The multi-dimensional data may be continuous data. Further, the processor unit also may execute the computer usable program code to generate decisions regarding operation of the well site using the properties identified for the each cluster unit in the set of cluster units.

Other objects, features and advantages of the present invention will become apparent to those of skill in art by reference to the figures, the description that follows and the claims.

DETAILED DESCRIPTION OF THE DRAWINGS

In the following detailed description of the preferred embodiments and other embodiments of the invention, reference is made to the accompanying drawings. It is to be understood that those of skill in the art will readily see other embodiments and changes may be made without departing from the scope of the invention.

Figure 1:
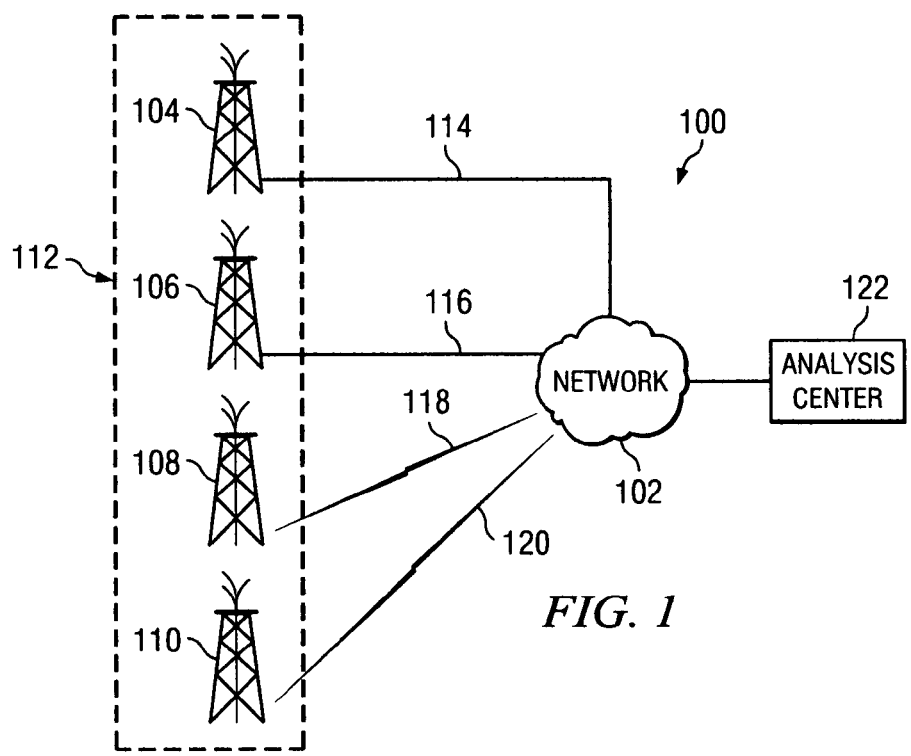
FIG. 1 is a pictorial representation of a network data processing system in which a preferred embodiment of the present invention may be implemented.

With reference now to FIG. 1, a pictorial representation of a network data processing system is depicted in which a preferred embodiment of the present invention may be implemented. In this example, network data processing system 100 is a network of computing devices in which different embodiments of the present invention may be implemented. Network data processing system 100 includes network 102, which is a medium used to provide communications links between various devices and computers in communication with each other within network data processing system 100. Network 102 may include connections, such as wire, wireless communications links, or fiber optic cables. The data could even be delivered by hand with the data being stored on a storage device, such as a hard disk drive, DVD, or flash memory.

In this depicted example, well sites 104, 106, 108, and 110 have computers or other computing devices that produce data regarding wells located at these well sites. In these examples, well sites 104, 106, 108, and 110 are located in geographic region 112. This geographic region is a single reservoir in these examples. Of course, these well sites may be distributed across diverse geographic regions and/or over multiple reservoirs, depending on the particular implementation. Well sites 104 and 106 have wired communications links 114 and 116 to network 102. Well sites 108 and 110 have wireless communications links 118 and 120 to network 102.

Analysis center 122 is a location at which data processing systems, such as servers are located to process data collected from well sites 104, 106, 108, and 110. Of course, depending on the particular implementation, multiple analysis centers may be present. These analysis centers may be, for example, at an office or an on-site in geographic location 112 depending on the particular implementation. In these illustrative embodiments, analysis center 122 analyzes data from well sites 104, 106, 108, and 110 using processes for different embodiments of the present invention.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

The different embodiments recognize that being able to analyze all of the different types of data available from well sites is useful in identifying formations. In particular, using different types of data obtained from a well site allows for identifying heterogeneity in formations or regions over which the well site sits.

The different embodiments of the present invention provide a computer implemented method, apparatus, and computer usable program code for identifying rock heterogeneity. These embodiments also facilitate the selection of coring sampling locations based on the identified heterogeneity, and solutions for various oilfield problems. In these illustrative embodiments, the heterogeneity of a formation is identified using continuous well data. This continuous well data includes, for example, well logs, measurements while drilling data, mud logs, drill cuttings, and other information that are combined to form a multi-dimensional data set. After sampling occurs, material properties are measured and these properties are associated with the multi-dimensional data. These material properties include, for example, reservoir, geochemical, petrologic, and mechanical properties. Next, models for propagating each of the measured properties along the length of the wellbore are obtained.

Also, models for predicting properties in other well sites and making decisions about the well site also may be obtained from this information. In this manner, the different illustrative embodiments allow for a construction of non-conventional three dimensional models that are based on well data for use in managing a reservoir. This information may be used for better discrimination of production sweet spots and for better guidance for drilling and production planning.

Figure 2:
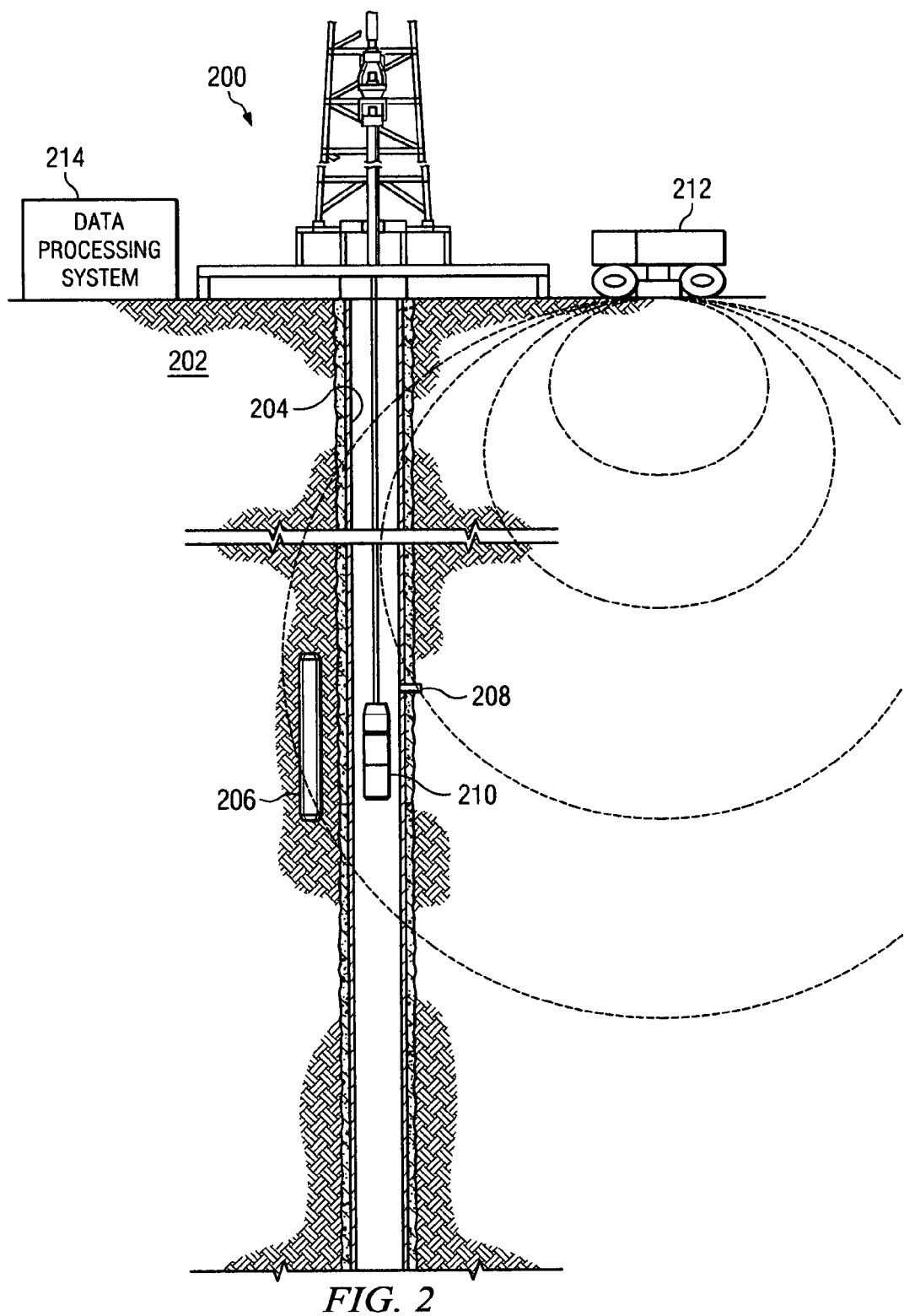
FIG. 2 is a diagram illustrating a well site from which data is obtained in accordance with a preferred embodiment of the present invention.

Turning now to FIG. 2, a diagram illustrating a well site from which data is obtained is depicted in accordance with a preferred embodiment of the present invention. Well site 200 is an example of a well site, such as well site 104 in FIG. 1. The data obtained form well site 200 is referred to as multi-dimensional data in these examples.

In this example, well site 200 is located on formation 202. During the creation of wellbore 204 in formation 202, different samples are obtained. For example, core sample 206 may be obtained as well as sidewall plug 208. Further, logging tool 210 may be used to obtain other information, such as pressure measurements and factor information. Further, from creating wellbore 204, drill cuttings and mud logs are obtained.

Other information, such as seismic information also may be obtained using seismic device 212. This information may be collected by data processing system 214 and transmitted to an analysis center, such as analysis center 122 in FIG. 1 for analysis. For example, seismic measurements made by seismic device 212 may be collected by data processing system 214 and sent for further analysis.

The information collected at well site 200 may be divided into groups of continuous data and groups of discrete data. The continuous data may be well site data or laboratory data and the discrete data also may be well site data or laboratory data in these examples. Well site data is data obtained through measurements made on the well while laboratory data is made from measurements obtained from samples from well site 200. For example, continuous well site data includes, for example, seismic, log/log suite and measurements while drilling. Continuous laboratory data includes, for example, strength profiles and core gamma information. Discrete well site data includes, for example, sidewall plugs, drill cuttings, pressure measurements, and gas flow detection measurements. The discrete laboratory data may include, for example, laboratory measurements made on plugs or cores obtained from well site 200. Of course, the different illustrative embodiments may be applied to any continuous well site data, continuous laboratory data, discrete well site data, and discrete laboratory data in addition to or in place of those illustrated in these examples.

The images of core samples and other data measured or collected by devices at well site 200 may be sent to data processing system 214 for transmission to the analysis center. More specifically, the multi-dimensional data may be input or received by data processing system 214 for transmission to an analysis center for processing. Alternatively, depending on the particular implementation some or all processing of the multi-dimensional data from well site 200 may be performed using data processing system 214. For example, data processing 214 may be used to preprocess the data or perform all of the analysis on the data from well site 200. If all the analysis is performed using data processing system 214 the results may then be transmitted to the analysis center to be combined from results from other well sites to provide additional results.

Figure 3:
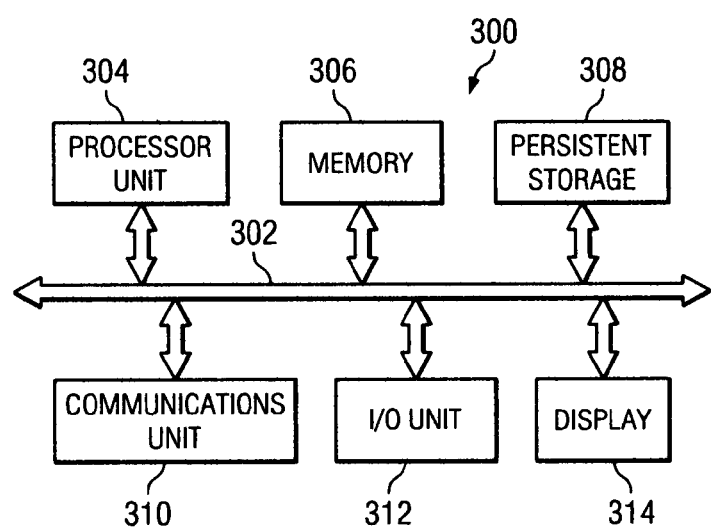
FIG. 3 is a diagram of a data processing system in accordance with an advantageous embodiment of the present invention.

Turning now to FIG. 3, a diagram of a data processing system is depicted in accordance with an advantageous embodiment of the present invention. Data processing system 300 is an example of a data processing system that may be used to implement data processing system 214 in FIG. 2. Further, the different computing devices found at other well sites and at analysis center 122 in FIG. 1 may be implemented using data processing system 300. In this illustrative example, data processing system 300 includes communications fabric 302, which provides communications between processor unit 304, memory 306, persistent storage 308, communications unit 310, I/O unit 312, and display 314.

Processor unit 304 executes instructions for software that may be loaded into memory 306. Processor unit 304 may be a set of one or more processors or may be a multi-processor core, depending on the particular implementation. Further processor unit 306 may be implemented using one or more heterogeneous processor systems in which a main processor is present with secondary processors on a single chip. Memory 306, in these examples, may be, for example, a random access memory. Persistent storage 308 may take various forms depending on the particular implementation. For example, persistent storage 308 may be, for example, a hard drive, a flash memory, a rewritable optical disk, a rewritable magnetic tape, or some combination of the above.

Communications unit 310, in these examples, provides for communications with other data processing systems or devices. In these examples, communications unit 310 is a network interface card. I/O unit 312 allows for input and output of data with other devices that may be connected to data processing system 300. For example, I/O unit 312 may provide a connection for user input though a keyboard and mouse. Further, I/O unit 312 may send output to a printer. Display 314 provides a mechanism to display information to a user.

Instructions for the operating system and applications or programs are located on persistent storage 308. These instructions and may be loaded into memory 306 for execution by processor unit 304. The processes of the different embodiments may be performed by processor unit 304 using computer implemented instructions, which may be located in a memory, such as memory 306.

The different embodiments allow for analyzing data from different sources, such as data obtained from well site 200 in FIG. 2 to identify different layers in a formation. In other words, the different embodiments allow for identifying the heterogeneity of a formation. In the illustrative examples, this identification is made using continuous well data, such as the continuous well data that is obtained from well site 200 in FIG. 2. More specifically, the different embodiments use cluster analysis to identify patterns in multi-dimensional data about a region in the ground to identify rock heterogeneity. In other words, this information from the well site allows for an identification of different regions or groupings within a formation. In these examples, the identification of different regions may be in other zones or structures other than a formation in the ground. In these illustrative examples, a zone is some selected cross-section in the ground or some three dimensional zone in the ground. A zone may include an entire formation, portion of formation, or other structures. In other words, a zone may cover any part of the earth under the ground. The identification of zones with similar and dissimilar material properties may be identified through this type of analysis.

After the identification of the heterogeneity of formation is obtained, an identification of the properties of the different regions within the formation may be made. The identification may be made using the multi-dimensional data already collected from the well site. Alternatively, sampling of the different layers or groupings may be made for analysis of the properties. This sampling may be made through, for example, coring, sidewall plugging, or cuttings. The properties of the samples are measured and these properties may be associated with the multi-dimensional data to identify the properties for different regions within a formation. These regions are also referred to as cluster units in the different embodiments. Further, this information also is used to make decisions about the management of the well site.

Figure 4:
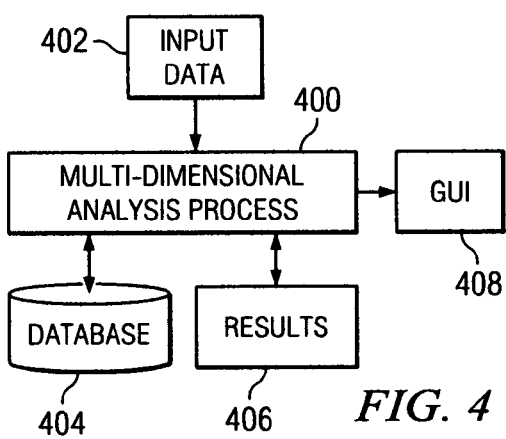
FIG. 4 is a diagram illustrating components used to analyze multi-dimensional data from one or more well sites in accordance with a preferred embodiment of the present invention.

With reference now to FIG. 4, a diagram illustrating components used to analyze multi-dimensional data from one or more well sites is depicted in accordance with a preferred embodiment of the present invention. Multi-dimensional analysis process 400 may execute on a data processing system, such as data processing system 300 in FIG. 3. Multi-dimensional analysis process 400 receives input data 402 and stores input data 402 in database 404. In these illustrative examples, input data 402 takes the form of multi-dimensional data obtained from a well site, such as well site 200 in FIG. 2. This input data may take various forms, such as, for example, continuous data and discrete data for the well site. Database 404 may be implemented using a currently existing database system. In these examples, database 404 may take the form of a sequential query language (SQL) database.

Multi-dimensional analysis process 400 analyzes the data in database 404 to generate results 406. More specifically, in these embodiments, multi-dimensional analysis process 400 contains the different processes to perform cluster analysis on input data 402 stored in database 404. Multi-dimensional analysis process 400 identifies different regions with similar and dissimilar properties. This software component also may be used to associate measured properties of the different regions and associate those properties with input data 402 in a manner that allows for an identification of the different regions. For example, input data 402 may include continuous well data, such as well logs, measurements while drilling, mud logs, and drill cuttings.

In identifying the similar and dissimilar properties for different regions using cluster analysis, multi-dimensional analysis process 400 identifies the different regions using the continuous well data in the multi-dimensional data set in these illustrative embodiments. In other words, the different types of regions or cluster units under the well site along the wellbore are identified, but not the properties of these regions or cluster units. In these examples, the actual property for identification of the region is not made during this portion of the process. For example, reservoir, geochemical, petrologic, and mechanical properties are not identified through this process. These types of properties are identified subsequently using sampling or other well site data.

After the identification of regions is made, multi-dimensional analysis process 400 may then use multi-dimensional data gathered from the well site to identify properties for these different regions. These properties may include, for example, reservoir, geochemical, petrologic, and mechanical properties. Multi-dimensional analysis process 400 then associates these properties with results 406. The association of the properties with results 406 creates a model of the different regions below the well site along the length of the wellbore. These results may be verified through the performing sampling at the various regions within the borehole. When these different regions are identified, a sampling of data for these different regions may made through techniques, such as coring, sidewall plugging, or cuttings for further verification of these results. The material properties of these samples may be measured. These material properties are properties of the particular region from which the sample is taken.

With this association, a model may be generated to propagate the measured properties along the length of the well from which input data 402 was obtained. This model may be used to predict properties for other wells and for making decisions about the current well site.

The control of multi-dimensional analysis process 400 and the presentation of results 406 are made using graphical user interface (GUI) 408. Graphical user interface 408 allows a user to see and interpret the different results. Additionally, graphical user interface 408 also allows a user to change parameters used to analyze input data 402. With results 406, three dimensional scale models may be constructed based on the well data to allow for better discrimination in production, such as identifying sweet spots. Further, better guidance for drilling and production planning also may be made with the models generated in results 406.

Figure 5:
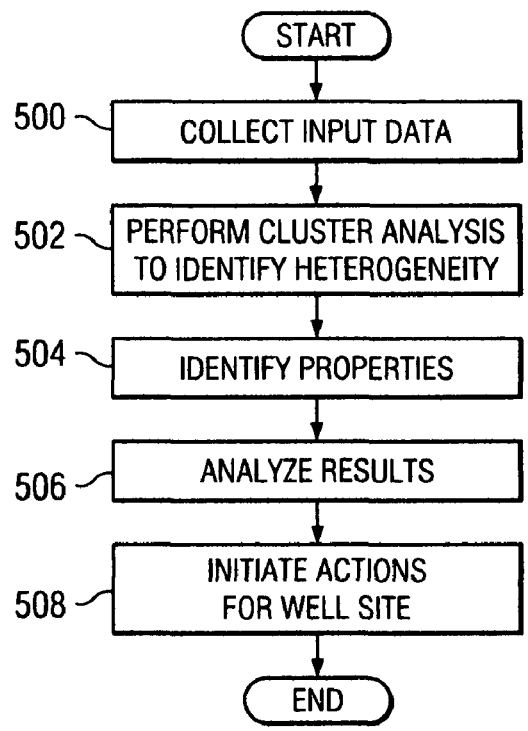
FIG. 5 is a flowchart of a process for managing a well site using multi-dimensional data in accordance with a preferred embodiment of the present invention.

Turning next to FIG. 5, a flowchart of a process for managing a well site using multi-dimensional data is depicted in accordance with a preferred embodiment of the present invention. The process illustrated in FIG. 5 may be implemented manually and/or in a data processing system. When implemented using a data processing system, the components illustrated in FIGS. 3 and 4 are the software and hardware components that may be used to implement the process.

The process begins by collecting input data (step 500). The input data may be collected from a well site, such as well site 200 in FIG. 2. This input data forms input data, such as input data 402 in FIG. 4. Thereafter, cluster analysis is performed on the input data to identify heterogeneity (step 502). This cluster analysis is performed to identify the cluster units along the wellbore that are considered to have the same properties or different properties. Thereafter, the properties within the different cluster units are identified (step 504) and the results are analyzed (step 506). This analysis may include results from step 504 analyzed with data gathered from other well sites.

Thereafter, actions are initiated for the well site (step 508) with the process terminating thereafter. These actions may include identifying sweet spots and providing recommendations for drilling and production planning, as well as implementing the recommended operations. The actions taken in step 508 may be any action related to the well site or well sites of interest. The different steps illustrated in FIG. 5 may be used to provide services to a client for a fee.

Figure 6:
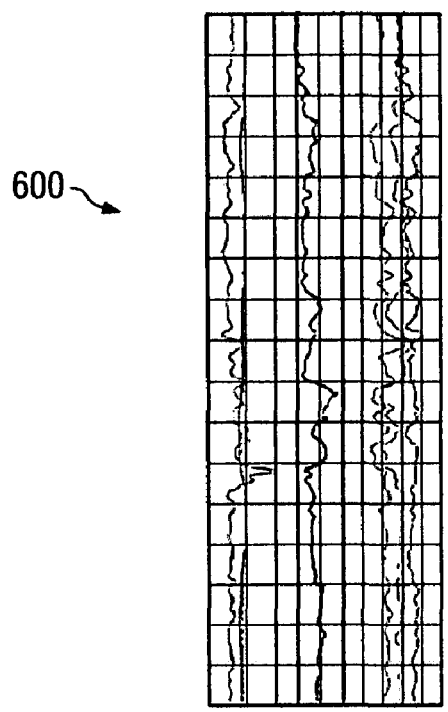
FIG. 6 is a diagram illustrating log measurement data that may be found in multi-dimensional data in accordance with a preferred embodiment of the present invention.

Turning now to FIG. 6, a diagram illustrating log measurement data that may be found in multi-dimensional data is depicted in accordance with a preferred embodiment of the present invention. In this example, log measurement suite 600 is an example of a log that may be obtained from a well site, such as well site 200 in FIG. 2. In particular, log measurement suite 600 is an example of continuous data that may be used to identify similar and dissimilar regions within a formation.

Log measurement suite 600 may be used as input data, such as input data 402 in FIG. 4. Log measurement suite 600 may contain data of any kind of data that may be collected from the well site, such as, for example, log, number, or a table. Log measurement suite 600 may include information such as porosity, resistivitiy, gamma ray, borehole, imaging, mud log, continuous measurements while drilling, continuous drilling surveys, or any other type of data.

Figure 7:
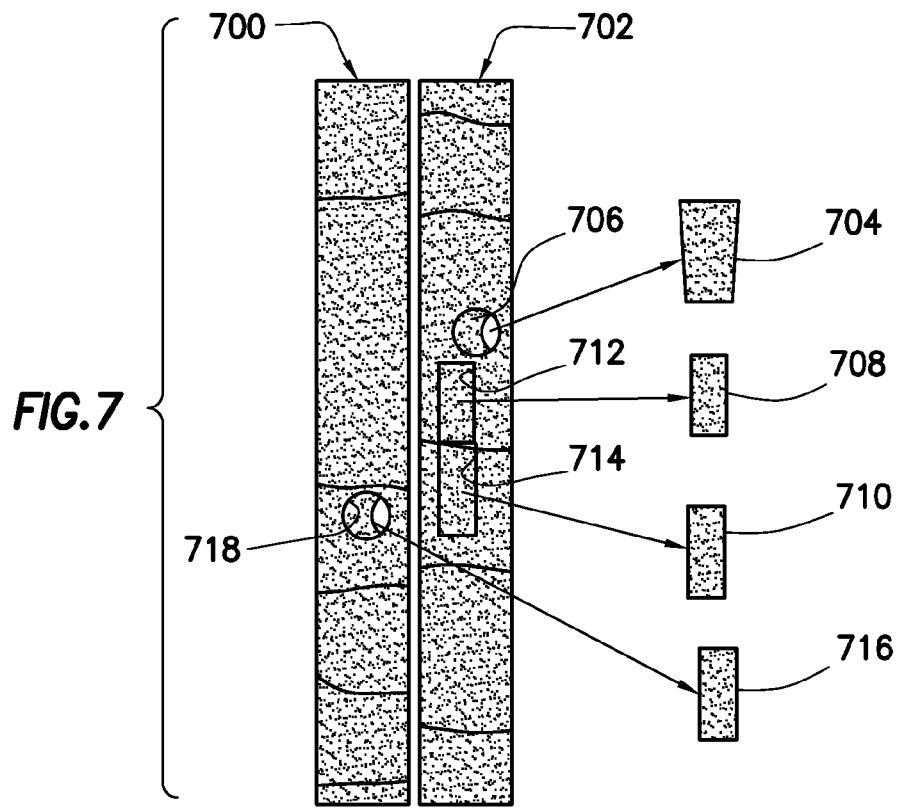
FIG. 7 is a diagram illustrating images of core samples that may be used to perform multi-dimensional data analysis in accordance with a preferred embodiment of the present invention.

Turning now to FIG. 7, a diagram illustrating images of core samples that may be used to perform multi-dimensional data analysis is depicted in accordance with a preferred embodiment of the present invention. In this illustrative example, core samples 700 and 702 are examples of core samples obtained from a well site, such as well site 200 in FIG. 2. Core plug 704 is taken from locations 706 in core sample 702. Core plug 704 is a sub-sample of core sample 702 in these examples. Core plugs 708 and 710 are sub-samples taken from core sample 702 from locations 712 and 714, respectively. Core plug 716 is taken from location 718 in core sample 700.

These different core samples and plugs are examples of discrete data that may be obtained from a well site for use as input data or analysis process, such as multi-dimensional analysis process 400 in FIG. 4. These core samples and the core plugs taken from the core samples may be used in performing multi-dimensional data analysis to characterize rock heterogeneity in a formation.

Figure 8:
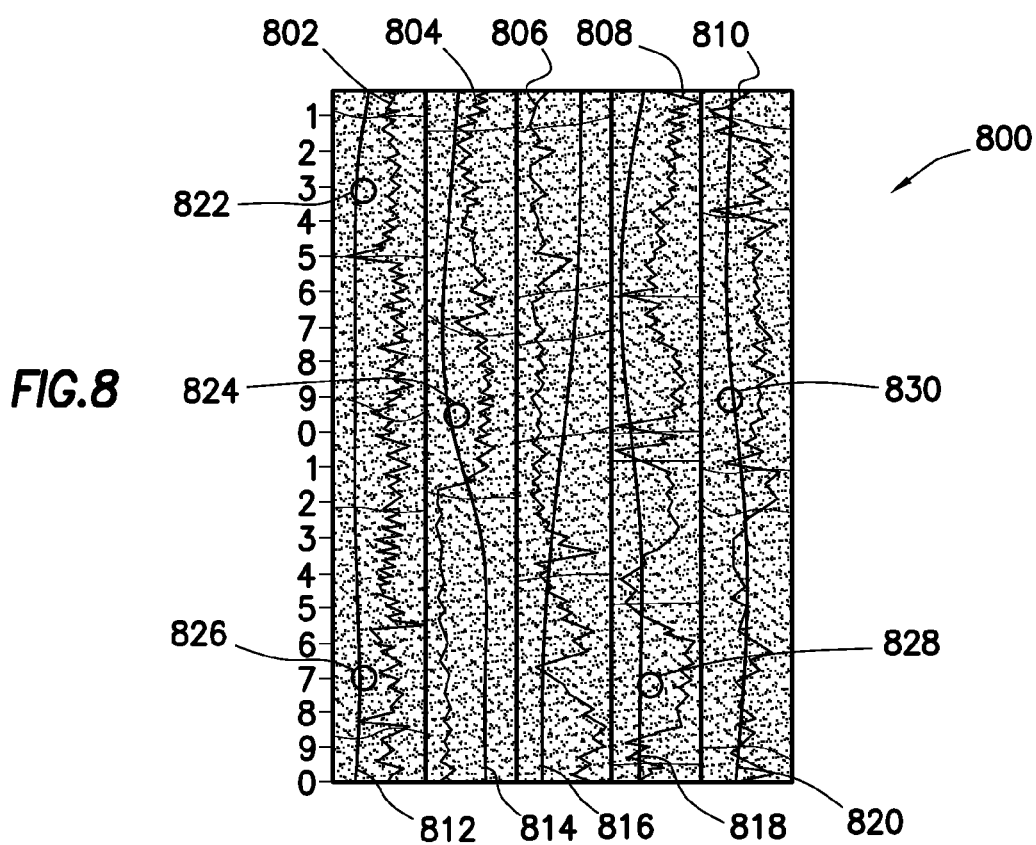
FIG. 8 is a diagram illustrating continuous data overlaid on images of core samples in accordance with a preferred embodiment of the present invention.

With reference next to FIG. 8, a diagram illustrating continuous data overlaid on images of core samples is depicted in accordance with a preferred embodiment of the present invention. Core 800 is an image of a core that may be found in multi-dimensional data used as input data, such as input data 402 in FIG. 4.

In this example, core 800 is overlaid with different types of data. In this illustrative example, lines 802, 804, 806, 808, and 810 represent continuous strength profile data. Lines 812, 814, 816, 818, and 820 represent continuous core gamma ray data. These two types of data are overlaid onto images of core 800 to illustrate the measurements at particular locations from this core sample. Further, specific depth measurements in core 800 are present at locations 822, 824, 826, 828, and 830.

In these examples, the specific measurements may be made through cylindrical samples oriented at various directions in relation to the core axis. These depth specific measurements also may be made from core sections, core fragments, or any type of depth specific sampling from core 800.

By overlaying data on the image of core 800, such as continuous strength profile data and continuous core gamma ray data, a selection of core samples to be taken may be made. This information may be used to select a location from which to take core plugs or biscuits. As can be seen, combining these three types of data allows for a more accurate identification of where sampling should be taken as opposed to a visual view of core 800.

Figure 9:
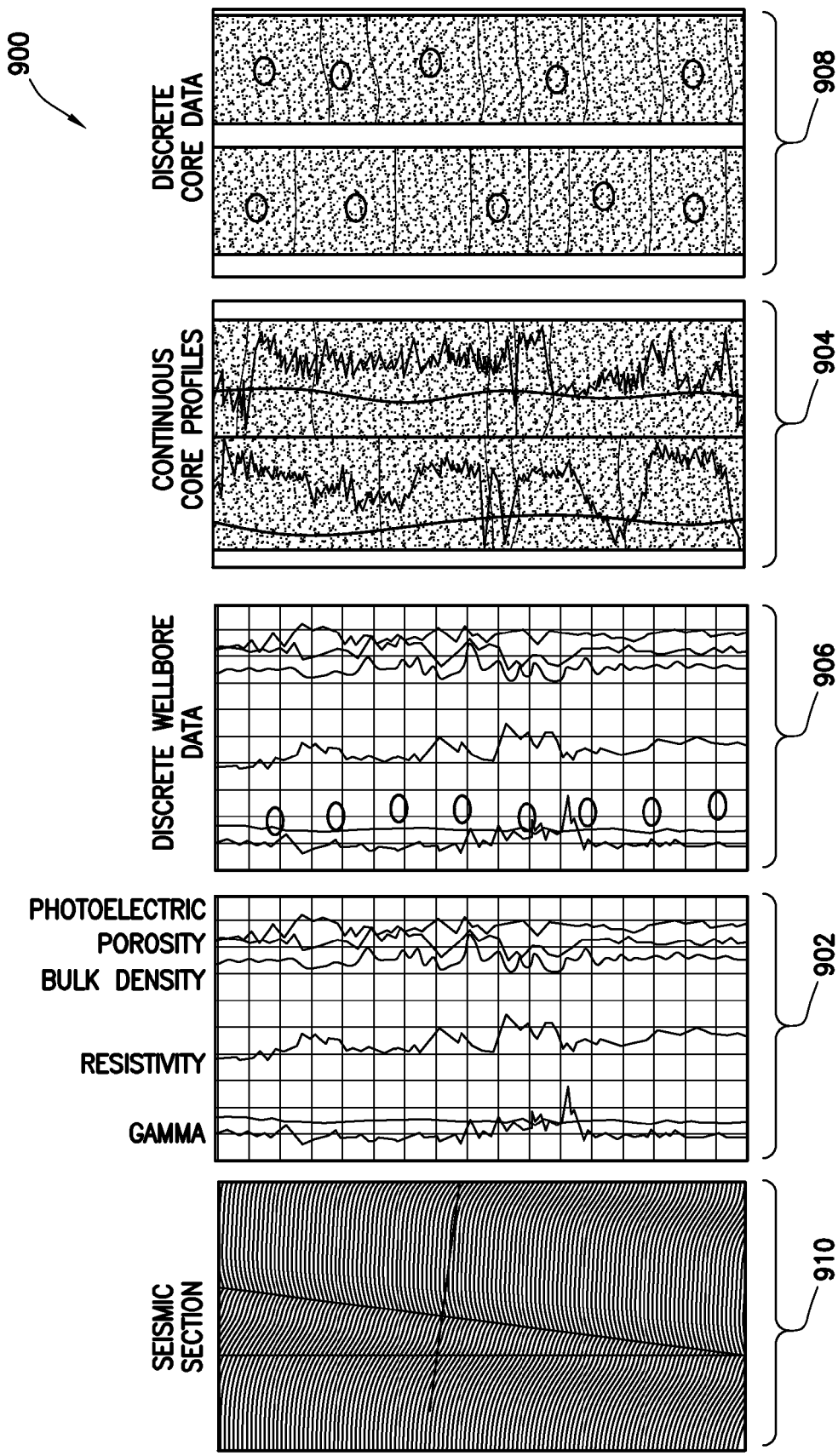
FIG. 9 is a diagram illustrating input data in accordance with a preferred embodiment of the present invention.

Turning now to FIG. 9, a diagram illustrating input data is depicted in accordance with a preferred embodiment of the present invention. From the different types of data illustrated above, input data 900 is assembled to form multi-dimensional data for analysis. Input data 900 may be assembled from the different types of data obtained from a well site, such as those illustrated in FIGS. 6-8. This input data is an example of input data 402 in FIG. 4 used in performing multi-dimensional analysis. More specifically, input data 900 is the basic input data used for cluster analysis. In this particular example, input data 900 includes continuous well log data 902, continuous core profile 904, discrete wellbore data 906, discrete core data 908 and seismic data 910. Well log data 902 may include, for example, wire line logs, mud logs and measurement while drilling data. Continuous core profiles 904 core may include information, such as strength profiles, core gamma measurements, and core photos or images. Of course, any continuous measurements may be used. An example of another type of continuous measurement that may be used is continuous core bulk density measurements or continuous core measurements of magnetic susceptibility. Discrete wellbore data 906 may include, for example, pressure measurements, gas and/or oil flow measurements, mini or micro fracs, leak off tests, fracture orientations, side-plug locations, and borehole breakout events. Discrete core data 908 may include, for example, laboratory tests made on the samples as well as sidewall measurements.

Continuous well data 902 is used to identify regions of similar and dissimilar properties in a formation or other structure or zone in the ground. After the different regions have been identified, other portions of input data 900, such as continuous core profile 904, discrete wellbore data 906, and discrete core data 908, may be integrated to provide an identification of the material properties of the different regions. In other words, the continuous data from a well site may be integrated along with the discrete data of the well in discrete samples using the different embodiments of the present invention. The types of data illustrated in the different figures are only examples of data that may be used by the different processes in the illustrative embodiments of the present invention. These examples are not meant to limit the types or amount of data that may be used.

In these examples, the input data 900 also includes seismic data 910. This seismic data is for a section located between well sites in these examples. The seismic data may be used to interpolate results generated from the analysis using processes for different embodiments of the present invention.

Figure 10:
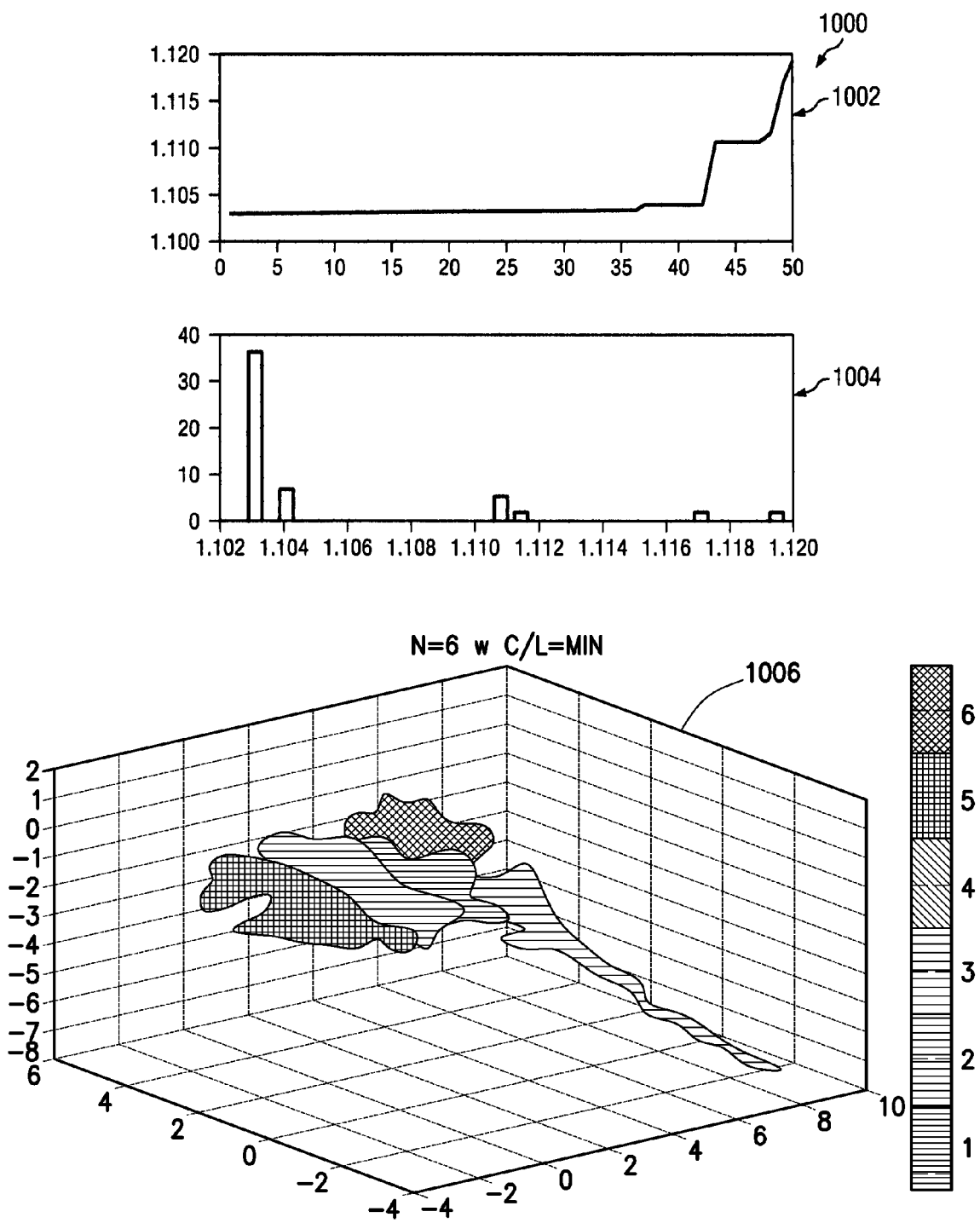
FIG. 10 is a display of information used in cluster analysis computations in accordance with a preferred embodiment of the present invention.

Turning next to FIG. 10, a display of information used in cluster analysis computations is depicted in accordance with a preferred embodiment of the present invention. In this example, display 1000 is an example of a display presented on graphical user interface 408 in FIG. 4. Within display 1000 distance minimization graph 1002 is shown along with histogram 1004. Distance minimization graph 1002 is a line graph that illustrates results from performing a cluster analysis on the input data using a software component, such as multi-dimensional analysis process 400 in FIG. 4. In these examples, the input data takes the form of continuous data.

In distance minimization graph 1002, the X-axis represents the run number, while the Y-axis represents the distance. In these examples, the cluster analysis may be run a selected number of times, such as fifty times on the data set. Each time, the smallest distance from the centroid of a cluster is illustrated in distance minimization graph 1002. Histogram 1004 is another view of the same data presented in distance minimization graph 1002. Histogram 1004 identifies the number of times that a particular distance has occurred. A three dimensional presentation of the input data is presented in graph 1006. Data points that are identified to be part of a cluster are presented with the same color or indicator in graph 1006. In this example, the number of groups identified for the cluster is six. The data that goes into the cluster analysis are the principal components of the input data in these examples. The groupings are based on identifying clusters of data when the principal components are plotted against each other in a three dimensional space. In these examples, the number of groupings is the number of clusters.

Each time a cluster analysis is run, a distance value is obtained. This distance value is the distance of each data point in the centroid of a cluster of which the data point is a member. In the depicted embodiments, it is desirable to keep the run that has the smallest overall distance. Further, in identifying this smallest distance, an evaluation of how the distance changes over each run is made using distance minimizing graph 1002 and histogram 1004. If the results settle on the smallest distance too quickly, a different number of groupings may be needed for the cluster analysis. In this example, graph 1002 indicates that the smallest distance has been settled on too quickly. Whether the distance settles too quickly may be made using a number of different mechanisms. For example, a user may look at the graphs and determine whether the smallest distance has been settled upon too quickly. Alternatively, a threshold identifying when the smallest distance has been obtained too quickly may be used. In this example, distance minimization graph 1002 has settled on the minimum distance within about three runs of the cluster analysis.

Evaluations of these graphs are used as control and feedback in the cluster analysis. Monitoring of these types of graphs is used for evaluation of convergent and statistical representation. The process may be reiterated automatically or manually. Principal component analysis is a standard statistical technique that is used for reducing the dimensionality of data by combining variances within data clouds. One output is the principal components of the original data themselves. These principal components are used in the cluster analysis in these depicted embodiments. Further, although the depicted examples use principal component analysis to deal with redundancies in data, other mechanisms or techniques may be used depending on the particular implementation. The goal in these examples is to reduce the redundancy of data present in the multi-dimensional data. For example, redundancies in the data sets may be identified in which some data sets are thrown out that are redundant to the data sets that are kept. The key principal components are used as input in cluster analysis to group the data according to its variability. This grouping of data is presented in graph 1006. Graph 1006 is a three dimensional visualization of the groupings. Manual or automatic iterations may be performed to optimize the selection of groupings.

In these examples, a key principal component may be, for example, a single data set such as a particular well log. Further, a key principal component also may be a combination of different data sets into a single data set. For example, within a set of ten data sets, principal component analysis may be used to transform the data in the ten data sets in a manner such that ten new transformed data sets are present. The property of these transformed data sets is, for example, the first data set, which is the first principal component, may use or soak up 75 percent of the variance of the original input data in the ten data sets. The second principal component may use up 15 percent of the variance, the third principal component may use up five percent of the variance and so forth such that when the tenth principal component is processed, 100 percent of the variance has been captured.

However, 90 percent of the variance in the original ten data sets may be used with only two principal components. With this type of selection, 90 percent of the original ten data sets may be described using only two of the transformed data sets. The other data sets not needed because they are relatively weak with respect to these first two principal components. In these illustrative embodiments, the number of principal components used is those that account for at least 90 percent of the initial variance. The selection of this percentage is made in these examples make the analysis easier. In other words, it is better to be able to completely analyze and visualize three data sets that may account for 90 percent of the entire input data set than having to process ten data sets. These key principal components are the different data sets for dimensions identified for use. Each of the data sets may have a number of groupings. For example, of the two data sets, three groupings may be present in which three groups of data are present in each data set.

Figure 11:
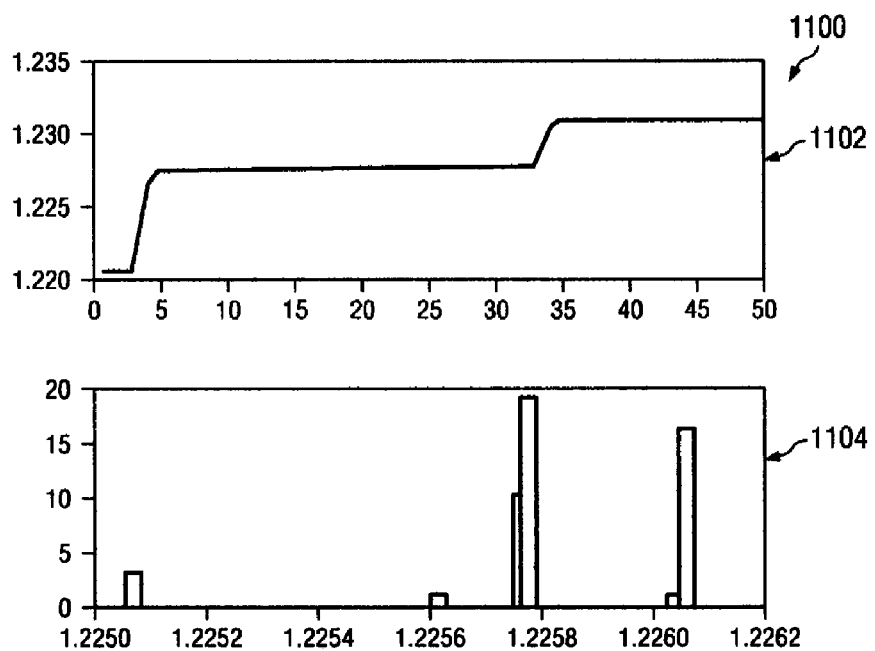
FIG. 11 is a diagram of a display used in cluster analysis computations in accordance with a preferred embodiment of the present invention.
Figure 11:
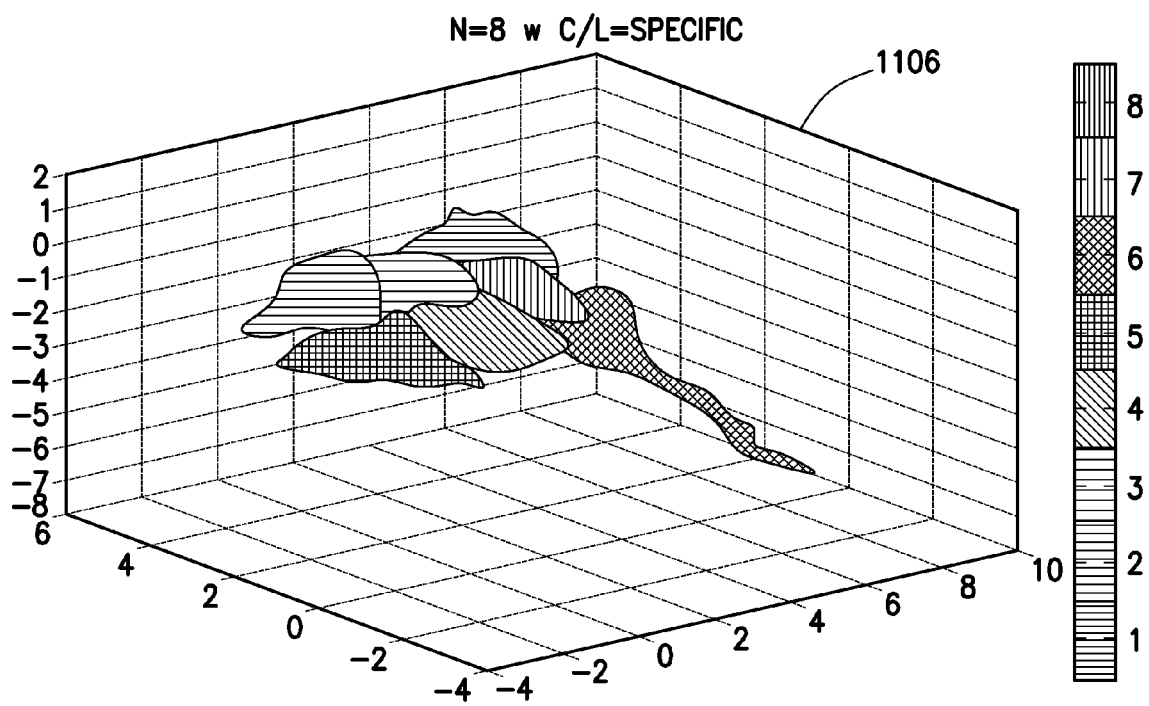
Figure 12A:
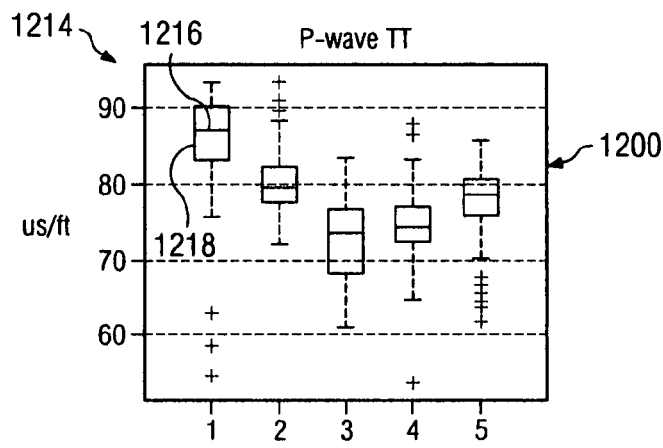
FIG. 12 is a diagram illustrating formation of cluster units from multi-dimensional data in accordance with a preferred embodiment of the present invention.
Figure 12B:
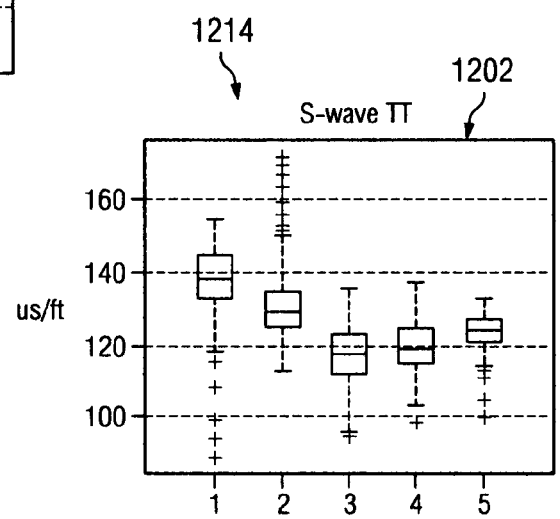
Figure 12C:
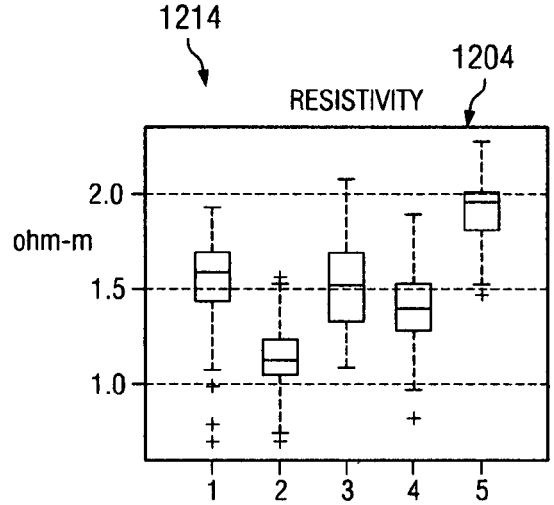
Figure 12D:
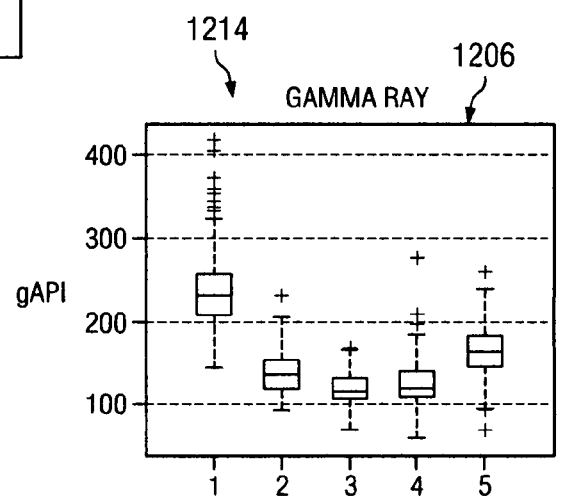
Figure 12E:
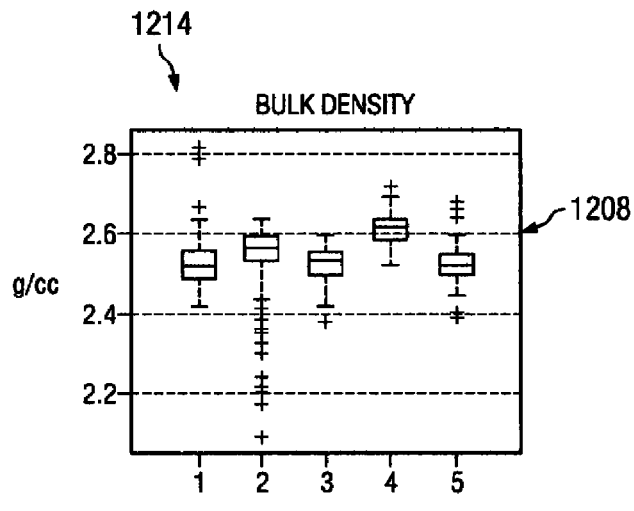
Figure 12F:
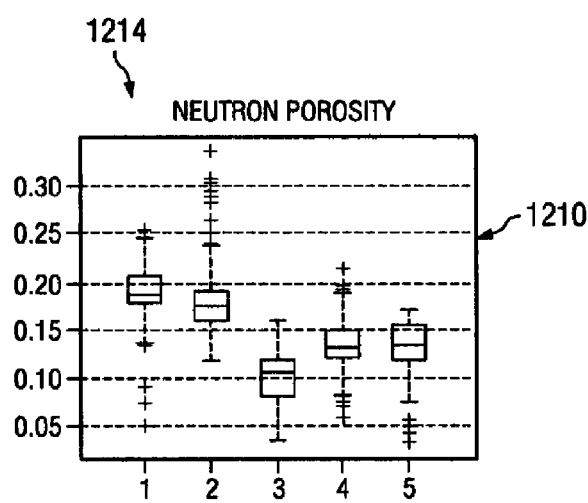
Figure 12G:
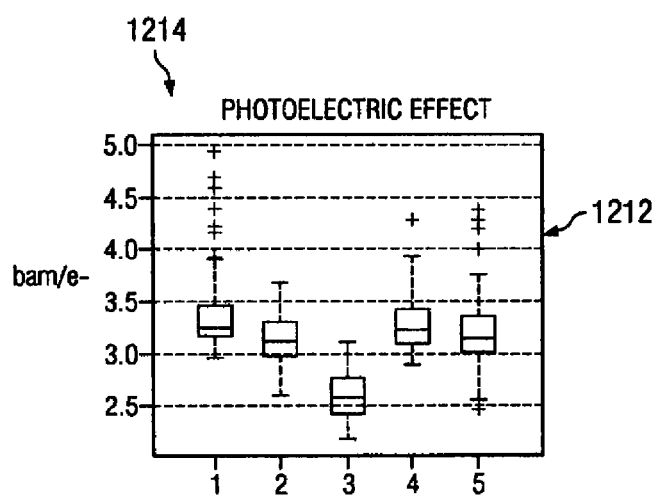

Turning next to FIG. 11, a diagram of a display used in cluster analysis computations is depicted in accordance with a preferred embodiment of the present invention. In this example, display 1100 includes distance minimization graph 1102, histogram 1104, and graph 1106. In this particular example, a number of clusters are set equal to eight in contrast to the six clusters illustrated in FIG. 10. In this example, the smallest distance between a data point and the centroids for the clusters have not settled quicker than some threshold value to be considered settling too quickly. As a result, this selection of groupings may be used to generate results for analysis.

Turning next to FIG. 12, a diagram illustrating formation of cluster units from multi-dimensional data is depicted in accordance with a preferred embodiment of the present invention. In this example, five groupings representing five clusters are present for seven log responses. In these examples, the X-axis in each log response represents the grouping number and the same different grouping number for different graphs represents the same grouping for different types of data. The Y-axis in each log response represents the units for values for the data points at those groupings.

In the depicted examples, these log responses are P-wave travel time 1200, S-wave travel time 1202, resistivity 1204, gamma ray 1206, bulk density 1208, neutron porosity 1210, and photoelectric effect 1212. The different graphs in display 1214 represent statistical distributions for each log response in the multi-dimensional data as a function of cluster.

The graphs of these log response are referred to as "box-and-whisker" diagrams in which the median value of the data is represented by a line within a box. For example, in P-wave travel time 1200 line 1216 in box 1218 represents the median value of the data. The boundary of box 1218 represents the dominant region of the data. Outliers are represented by other data points or "whiskers" outside of box 1218. The dominant region of the data may contain from 25 percent to 75 percent of the data in these examples.

In this example, grouping the data based on photoelectric effect 1212 results in only two clusters. Grouping the data presented in display 1214 based on photoelectric effects 1212 and gamma ray 1206 result in three to four clusters. This type of grouping occurs because elements with the same photoelectric effect have different gamma ray effects and thus fall into different groups. Using all of the data allows a differentiation in five distinct groups in these examples. Some of these groups may have a similar number of properties but will have at least one sufficiently different property to allow differentiation into a separate group.

In these illustrative examples, the cluster definitions are expressed as statistical distributions. These definitions may be associated with colors or visualization. The final groupings or clusters form cluster units.

Figure 13:
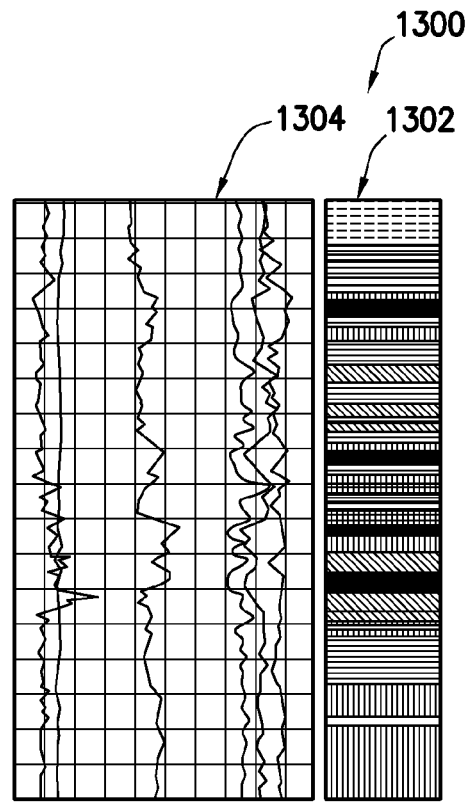
FIG. 13 is a diagram of a display with the results of a multi-dimensional cluster analysis in accordance with a preferred embodiment of the present invention.

Turning now to FIG. 13, a diagram of a display with the results of a multi-dimensional cluster analysis is depicted in accordance with a preferred embodiment of the present invention. Display 1300 illustrates results of multi-dimensional cluster analysis. Display 1300 is an example of a display presented using a user interface, such as graphical user interface 408 in FIG. 4. In display 1300, the multi-dimensional cluster analysis results are presented in a color-coded fashion to provide results that are easy to understand and interpret. Display 1300 presents results that represent the variability of all input variables in the input data in a color-coded display. These input variables are, for example, the different types of well log data obtained from a well site, such as well site 200 in FIG. 2.

The displays in FIGS. 10 and 11 provide an interface for a user to select a number of cluster units to represent all of the variability in the multi-dimensional data. For example, if the results in FIG. 10 are used with the number of cluster unit being six, then the variability of the data is six. Thus, six types of cluster units are present. The number of colors used for the graph in section 1302 is six. Then colors are assigned on a depth-by-depth basis based on the values of the data at the particular depth with the cluster definitions. If on the other hand, the results from FIG. 11 are used, then the number of types of cluster units found is eight.

In this case, eight different colors are used to identify the different types of cluster unit in section 1302. The values of all the data at a particular depth are evaluated with the cluster definitions to identify a particular cluster definition. The color for the cluster definition of a type of cluster unit that is identified is associated with the depth for use in section 1302. Each cluster number is associated with a color in these examples to make the visualization of the different types of cluster unit present easier for a user. Thus, the output in section 1302 represents cluster types at different depths.

These results are really a color translated version of cluster versus depth. The three dimensional graphs in FIGS. 10 and 11 do not include depth information to allow for analysis of identification of how the cluster units are arranged sequentially. Once the cluster units have been identified and each data point is assigned to a cluster unit, the results are plotted in a manner illustrated in section 1302 of display 1300.

Similar colors in section 1302 of display 1300 represent regions with similar material properties and different colors represent regions with different material properties. Section 1302, however, does not yet identify the particular material properties associated with each region. These colors only illustrate that regions of different and similar properties are present in the locations of those regions with respect to the wellbore from which the data was collected. Each discrete region in section 1302 is referred to as a cluster unit in the illustrative embodiments. The cluster unit in section 1302 having the same color as another cluster in this section is considered to be a cluster unit of the same type. In other words, these two cluster units have the same properties. The cluster unit having a different color from another cluster unit is considered a different type of cluster unit from the other cluster unit.

The logs in section 1304 in display 1300 are examples of continuous logs, such as well log data 902 in FIG. 9. The continuous log data in section 1304 may be used to analyze these cluster units in section 1302 to look for different properties that are similar for cluster units in display 1300 having the same color.

Further, this information may be used to identify where discrete samples may be taken for analysis to identify the properties for the different cluster units in the set of cluster units within section 1302. A set of cluster units contains one or more cluster units.

Figures 14, 15:
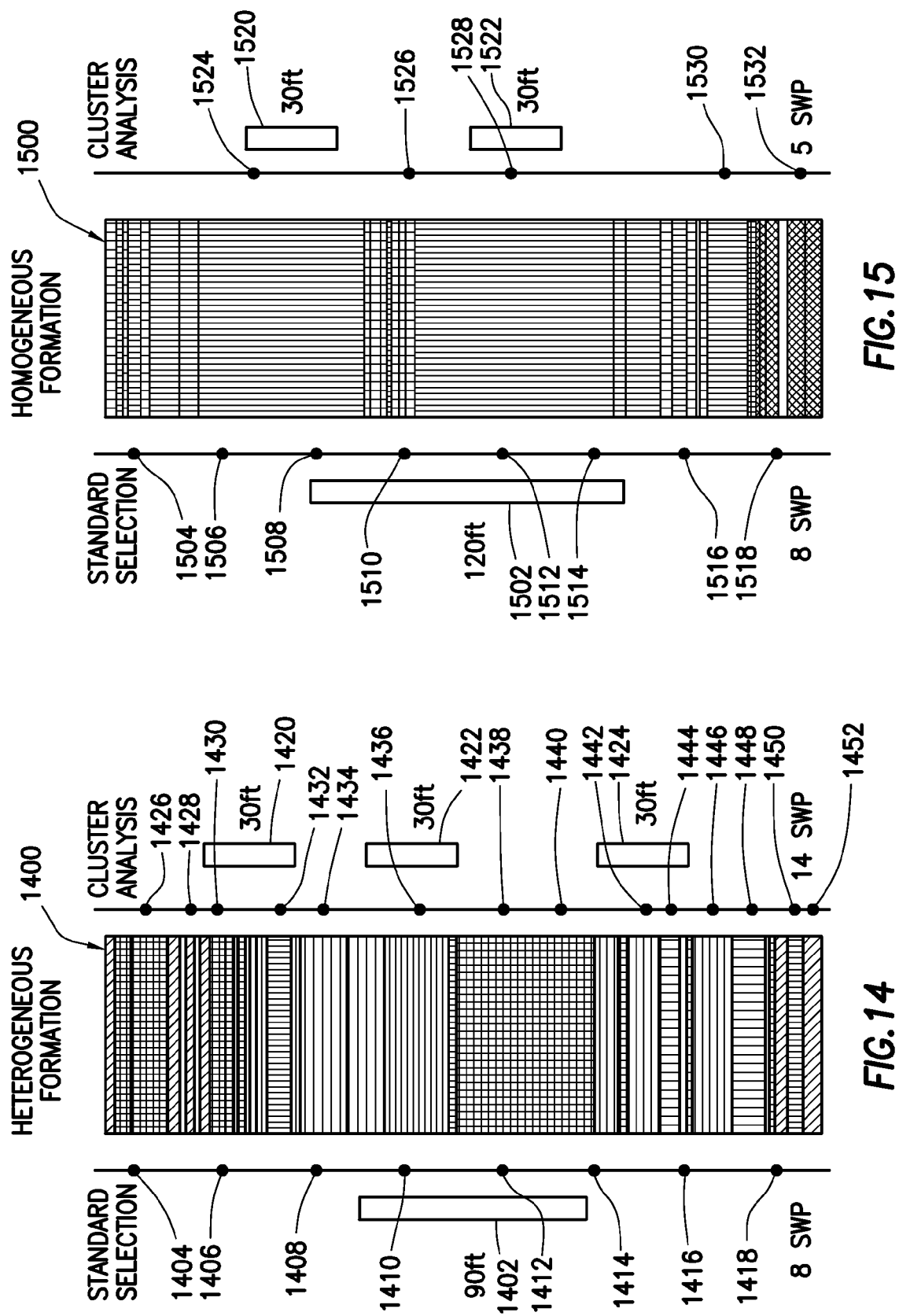
FIG. 14 is a diagram illustrating results for a heterogeneous formation in accordance with a preferred embodiment of the present invention.
FIG. 15 is a graph illustrating results from cluster analysis in accordance with a preferred embodiment of the present invention.

Turning now to FIG. 14, a diagram illustrating results for a heterogeneous formation is depicted in accordance with a preferred embodiment of the present invention. In this example, graph 1400 is an example of results generated from cluster analysis using a multi-dimensional analysis process, such as multi-dimensional analysis process 400 in FIG. 4. In this particular example, graph 1400 represents an identification of cluster units within a formation. For heterogeneous formations, the goal is to appropriately sample all of the different formations identified through the clustered units selected to ensure that a complete model is developed. Sections of graph 1400 with the color or cross-hatching indicate cluster units with the same properties. This information may be used to select appropriate sampling for the different cluster units to allow for proper identification of the properties for particular cluster units within graph 1400.

For example, if a standard selection of a 90 foot core is desired, a typical selection may be selection 1402. As can be seen, this selection does not provide samples from all of the different types of cluster units identified in this heterogeneous formation in graph 1400. Further, with a currently used selection system, a selection of eight sidewall plugs may be made at locations 1404, 1406, 1408, 1410, 1412, 1414, 1416, and 1418. As can be seen from this type of selection made without the benefit of graph 1400, the samples are not necessarily made in the manner that allows for identifying properties for the different types of cluster units present within the wellbore. In this illustrative example, sampling is performed after viewing the results in graph 1400. With the use of graph 1400, a 90 foot core section may be split up into sections 1420, 1422, and 1424. Each of these sections is 30 foot sections provide for sampling from the different types of cluster units present within the wellbore. This selection of where to take the core samples provides for samples that cover types of cluster units not covered by the selection in section 1402. Further, through the use of graph 1400 a determination may be made that additional sidewall plugs are needed from locations 1426, 1428, 1430, 1432, 1434, 1436, 1438, 1440, 1442, 1444, 1446, 1448, 1450, and 1452. As can be seen, the model in graph 1400 provides for a consistent reproducible quantification of heterogeneity in a formation through the discrimination of the overall formation into discrete cluster units with unique material properties. The sampling in these examples is performed by collecting core and sidewall plugs. Alternatively, cuttings or other techniques used to obtain the sampling needed.

Turning now to FIG. 15, a graph illustrating results from cluster analysis is depicted in accordance with a preferred embodiment of the present invention. In this example, graph 1500 is a graph of a dominantly homogenous formation. For homogeneous formations, a goal is to appropriately sample all of the clustered units, which typically results in reduced sampling and considerable cost savings.

The sampling decisions made based on the results presented in graph 1500 are equally applicable to heterogeneous formations. In this example, a 120 foot core as indicated in section 1502 is an example of a typical selection made without the results in graph 1500. Without the benefit of these results, a standard selection of sidewall plugs may be those in locations 1504, 1506, 1508, 1510, 1512, 1514, 1516, and 1518 for a total of eight sidewall plugs.

With the benefit of the results in graph 1500 the selection of the core may be reduced to a total of 60 feet as indicated in sections 1520 and 1522. Further, the number of sidewall plugs may be reduced to five taken from locations 1524, 1526, 1528, 1530, and 1532. In this manner, with the results in graph 1500 the length of the core and number of sidewall plugs needed for analyzing this homogeneous formation may be reduced.

Figure 16:
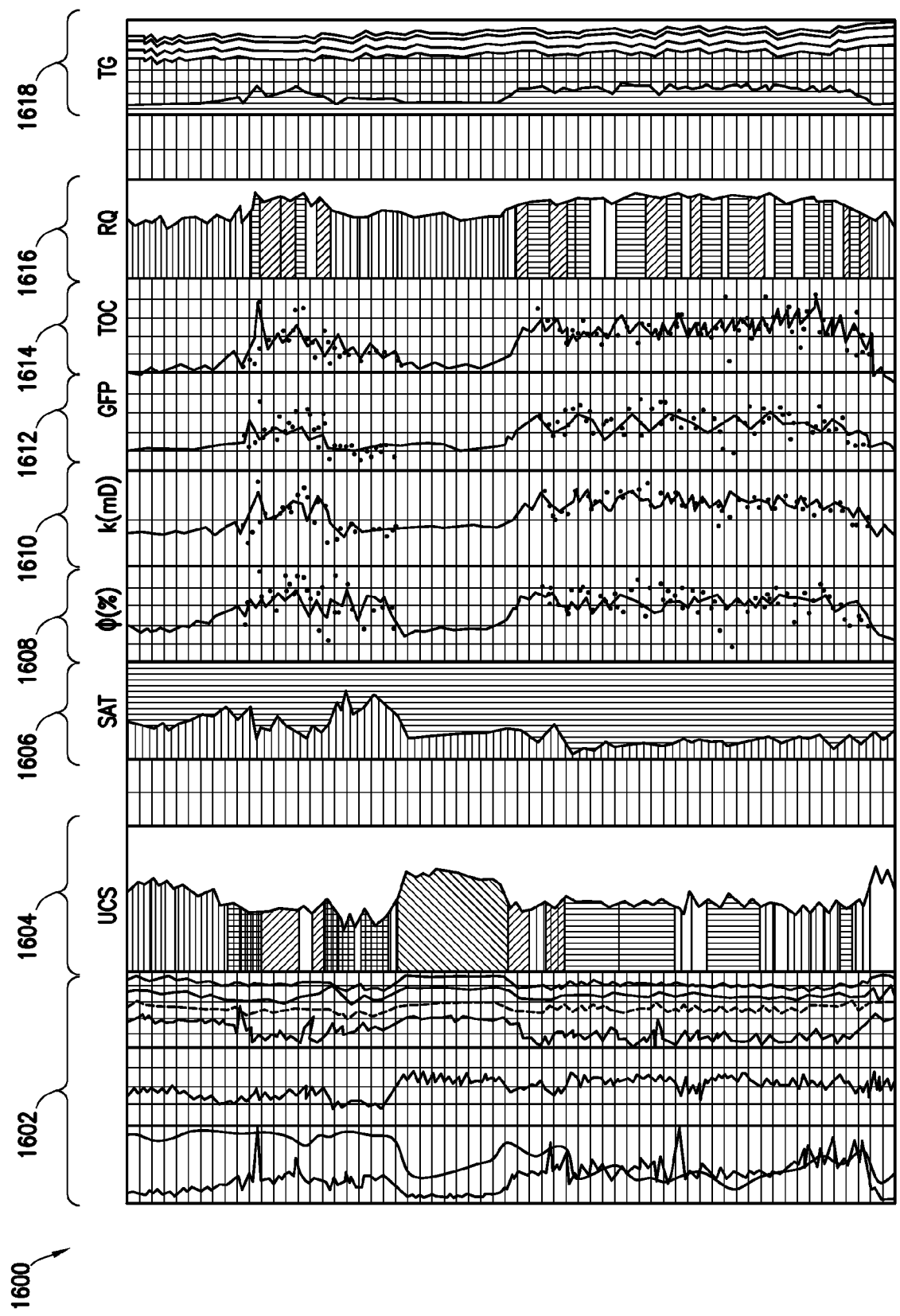
FIG. 16 is a diagram illustrating integration of wellbore data with results in accordance with a preferred embodiment of the present invention.

With reference now to FIG. 16, a diagram illustrating integration of wellbore data with results is depicted in accordance with a preferred embodiment of the present invention. In particular, FIG. 16 is an example of a model generated from identifying cluster types at different depths for a well site. In this example, graph 1600 contains continuous wellbore log data in section 1602. The results of cluster analysis are displayed in section 1604. In addition to discriminating between different cluster units or formations, this section also includes a profile of continuous strength measurements. Section 1606 provides information on water, gas, and oil saturations (SAT) in the pores. The effective porosity is found in section 1608 of graph 1600. Reservoir matrix permeability is presented in section 1610. Gas filled porosity and total organic content are found in sections 1612 and 1614 respectively. Section 1616 contains a breakdown of reservoir quality, while section 1618 provides an indication of total free gas in place.

In sections 1608, 1610, 1612, and 1614, discrete measurements made in the lab are illustrated by points depicted in these sections. The samples are identified using the results generated through cluster analysis, such as those in section 1604.

With the selection of the samples, a continuous graph or identification of these different properties may be made throughout the length of the wellbore. In these examples, data or samples is not necessarily needed depending on the particular portion. For example, if the wellbore data in section 1602 indicates that certain sections are not sections of interest. Therefore, samples from those sections may be excluded from the sampling selection. Further, a standard deviation may be obtained for each of the sections to insure that the graphs are sufficiently accurate within some margin of error.

With the continuous profiles generated in sections 1608, 1610, 1612, and 1614, predictions of reservoir quality in section 1616 and total gas in place in section 1618 may be made for the length of the wellbore for a well site in a particular formation. In these illustrative embodiments, a determination of reservoir quality is made possible through the cluster analysis and sampling based on the results of cluster analysis. Further, a more accurate identification of the total gas in place for different sections or depths in a formation may be made using the different embodiments. Sections 1616 and 1618 represent models constructed for the different clusters or regions analyzed.

Section 1604 is an example of a model or results such as those displayed in section 1302 in display 1300 in FIG. 13. This model may be subsequently used to propagate discrete or depth specific laboratory data continuously along the length of the region of interest. The continuous properties may then be used for analyzing reservoir and completion information. Further, these properties also may be used to make decisions regarding operations for a well. For example, the decisions may include the economics of the well and locations for fracturing. In this example, the reservoir quality in section 1616 provides a visual indication of the zones with the best reservoir quality, which provide the best potential for economic productivity for the particular well. The total gas predictions in section 1618 provide an assessment of the gas in place and allow for calculations of economics needed to recover the gas.

Figure 17:
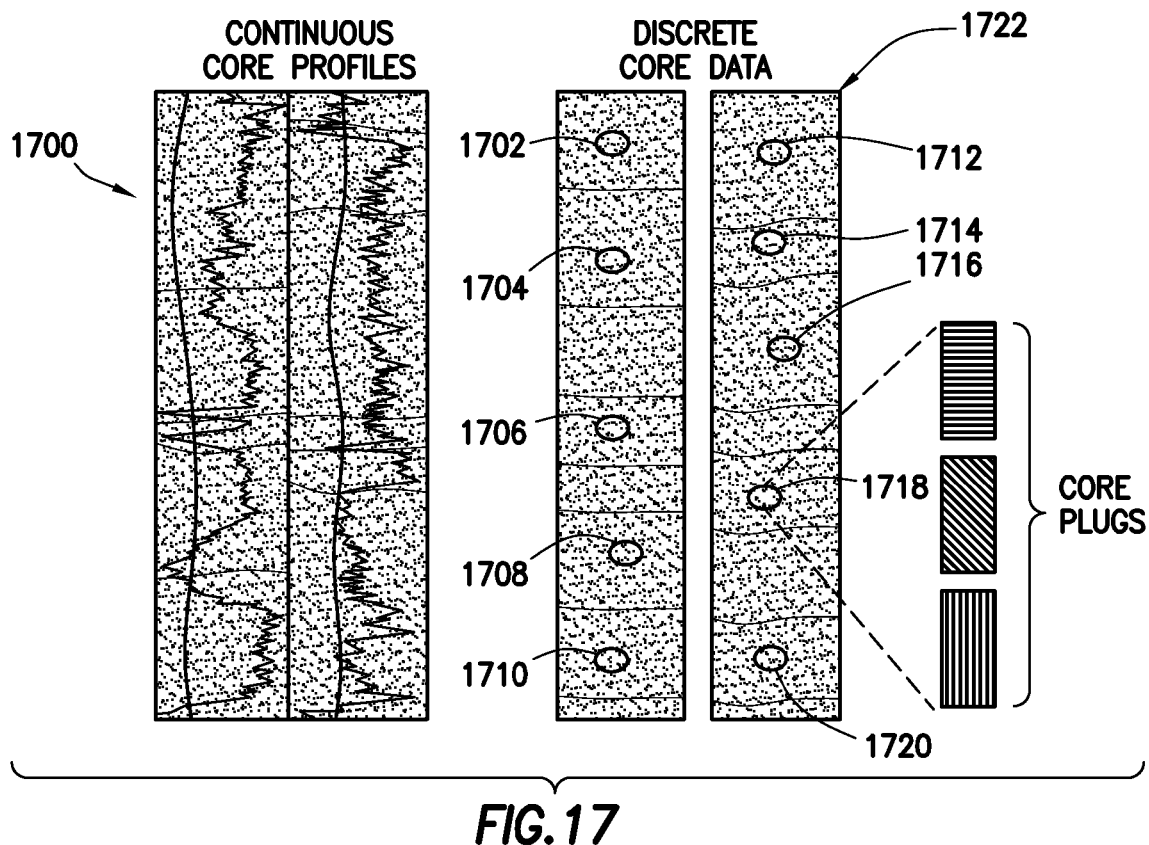
FIG. 17 is diagram illustrating core plugs in accordance with a preferred embodiment of the present invention.

Turning now to FIG. 17, diagram illustrating core plugs is depicted in accordance with a preferred embodiment of the present invention. When obtaining samples from cores, the heterogeneity of the core is evaluated using continuous measurements, such as strength profiles, core gamma profiles, and rock color profiles. These continuous properties are illustrated in section 1700. Then samples are collected to represent core sections with defined measured values, such as core plug samples from locations 1702, 1704, 1706, 1708, 1710, 1712, 1714, 1716, 1718 and 1720. The sampling from the core illustrated in section 1722 is sampled using various orientations in relation to the axis of the core. For example, three samples may be taken from each of these locations to provide vertical, horizontal, and oblique orientations with respect to the core axis. This type of sampling is important in characterizing anisotropic properties of the core. The samplings from the core as illustrated in section 1722 is used to verify the properties for the different types of cluster units identified along the length of the wellbore from which the core is sampled.

Currently, when testing a sidewall plug, only a single horizontal orientation is provided. In some cases, the core is not available and only sidewall plugs are obtained. With current techniques, an inability to accurately analyze the samples occurs. The different embodiments of the present invention recognize that miniature samples or sub-cores may be taken from the sidewall plug to obtain data that is normally obtained from multiple core samples taken from the core at different orientations.

Figure 18:
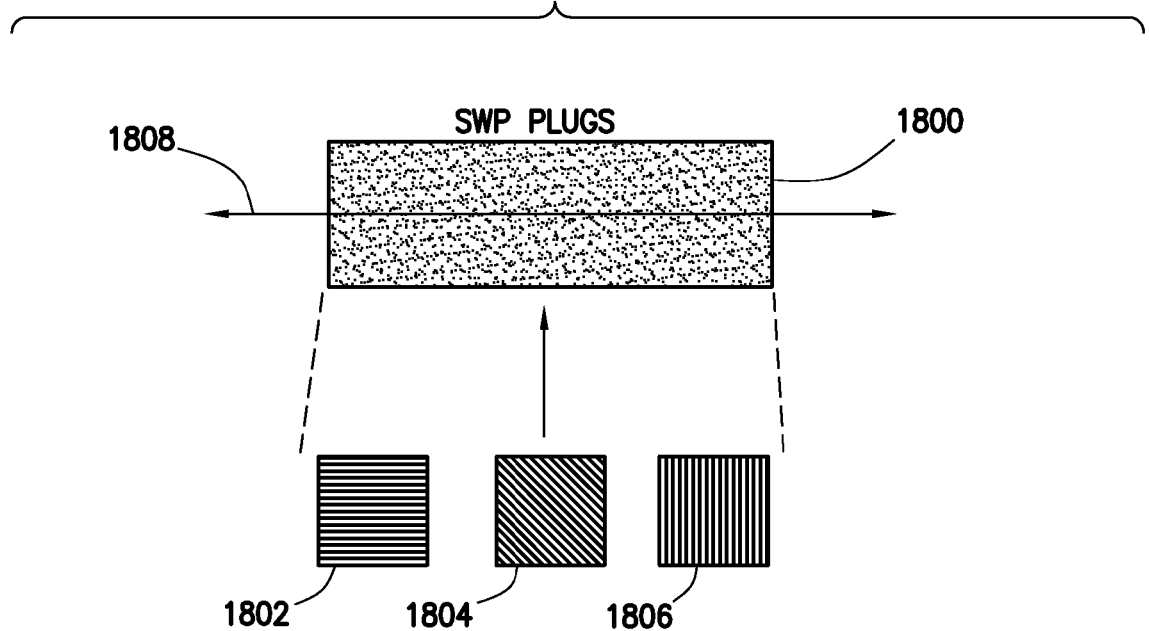
FIG. 18 is a diagram illustrating sampling at different orientations using sidewall plugs in accordance with a preferred embodiment of the present invention.

With reference next to FIG. 18, a diagram illustrating sampling at different orientations using sidewall plugs is depicted in accordance with a preferred embodiment of the present invention. For example, sidewall plug 1800 may be used to collect plugs 1802, 1804, and 1806. As can be seen, these plugs allow for samples to be obtained from different orientations with respect to axis 1808 of sidewall plug 1800. This type of sub-coring provides an ability to conduct a full analysis of the anisotropic properties on a sidewall plug. This technique is especially useful for a small grain sized rocks.

Although these examples illustrate obtaining sub-cores from three orientations from sidewall plug 1800 with respect to axis 1808, other numbers of sub-cores may be taken to obtain additional orientations depending on the particular implementation. In addition, some of the implementations may require only two orientations.

In these examples, representative samples should have a diameter of at least 10 to 30 times the size of the larges observable discontinuous feature in the material (for example, grain size, inclusions, pore spaces, etc.). Because sidewall plug samples are small, approximately 1 inch in diameter by 1.5 inches long, and smaller samples are obtained from them, the final smaller samples (to be still representative of the overall rock material) require that the rock constituents be very small. Thus the requirement for small grain size (less than around 10 microns in diameter) is present. Furthermore, small grain size rocks tend to be more locally homogeneous (for example, shales) than large grain size rocks (for example, conglomerate).

For larger grain size samples, multi-compression testing and numerical inversion to match the measured stress-strain data allows for evaluation of anisotropic mechanical data. Using either of these techniques allows for a complete characterization of reservoir, petrologic, geochemical, and mechanical properties from the core or sidewall plugs. In this manner, an inability to obtain a core does not prevent for the desired analysis of anisotropic properties for different depths.

Figure 19:
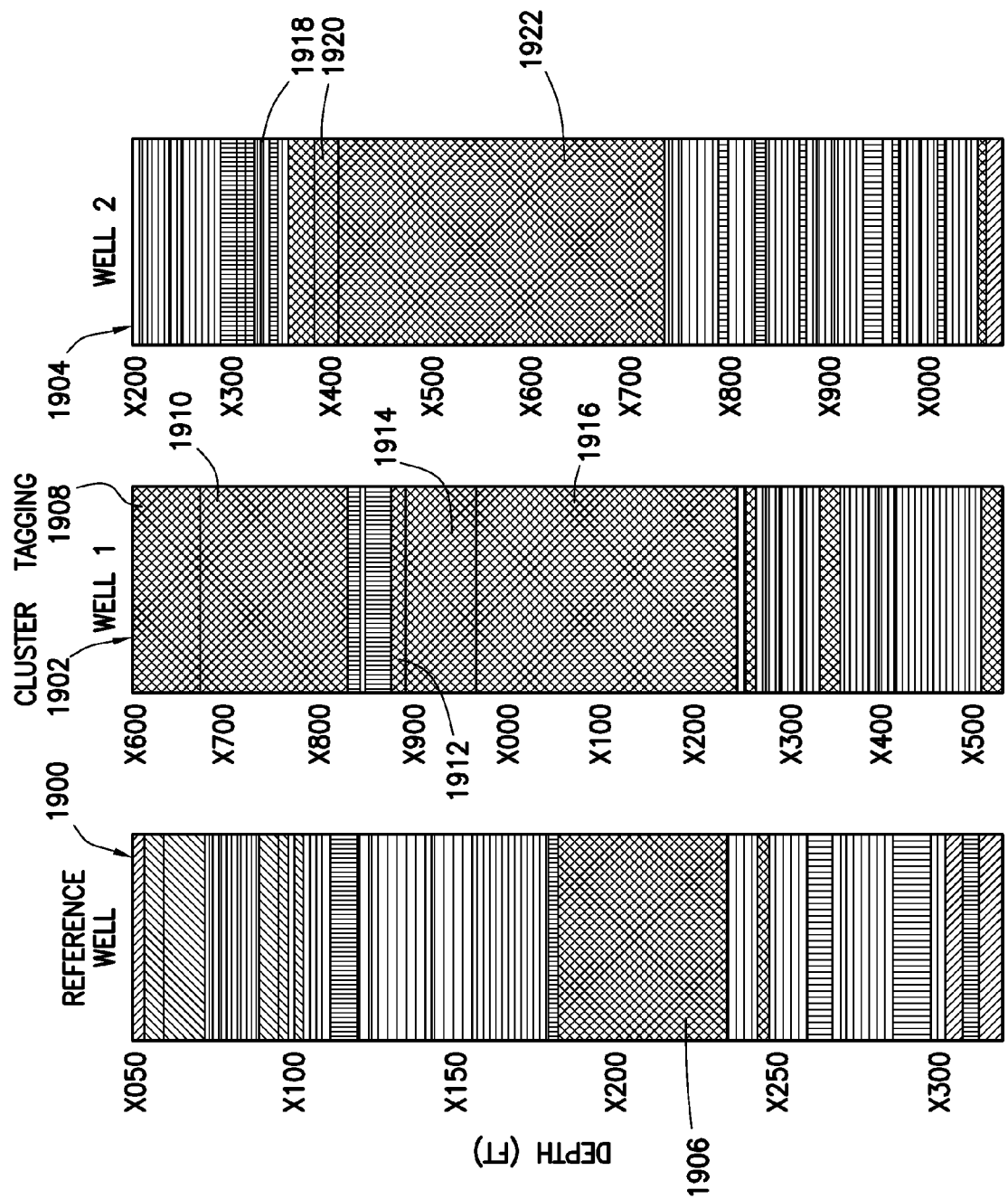
FIG. 19 is a diagram illustrating cluster tagging in accordance with a preferred embodiment of the present invention.

Turning now to FIG. 19, a diagram illustrating cluster tagging is depicted in accordance with a preferred embodiment of the present invention. In this example, graph 1900 is an example of results generated from cluster analysis. As can be seen, the same colors represent the same properties for different cluster units in a formation. Cluster units having the same color in graph 1900 are all of the same type in these examples. Once these different cluster units or regions have been identified, the definitions of these clusters in terms of multi-dimensional data may be used as a reference for identifying the same type of clusters on other subsequent wells. This identification is referred to as cluster tagging.

In performing cluster tagging, multi-dimensional data from the target well site having the same types of data as those in the reference well site are used to perform cluster tagging in these depicted embodiments. The multi-dimensional data at a selected depth for the target well site is compared to a reference set of data for the reference well site. This reference data is the multi-dimensional data for all of the different types of clusters that are present in the reference well. A determination is made as to whether the data from the target well site at the selected depth has a best fit or correlation for the data from the target well site for a particular type of cluster in the reference well. If such a correlation is present, the selected depth of the target well site is considered to be of the same cluster type for the reference well site. In some cases, the target well site may have a cluster type that is not present in the reference well site. In this case, a best fit or correlation does occur when the determination is made, but a compliant curve indicates that the fit is poor.

Then, the multi-dimensional data may be analyzed to identify characteristics for properties present in the multi-dimensional well data for each type of cluster unit that is present to create a model of the target well. Also, similar wellbore data may be examined for other wells and the wellbore data for sections matching identified cluster units may be used to make similar identifications in those wells. For example, graph 1902 and graph 1904 are examples of cluster tagging performed on adjacent wells with reference to the reference well associated with graph 1900. If a particular cluster unit is identified as having a best reservoir quality based on the complete analysis for graph 1900, similar cluster units may be identified in the other wells. For example, cluster unit 1906 is identified as providing the best reservoir quality. By using the multi-dimensional data for this particular cluster, that information may be compared to the same type of data for the other wells to identify cluster units in those wells that also have the best reservoir quality. In these examples, these are found in cluster units 1908, 1910, 1912, 1914, and 1916 in graph 1902. Regions 1918, 1920, and 1922 in graph 1904 are cluster units identified as having the best reservoir quality based on comparing the multi-dimensional well data between the different wells.

Thus, these examples indicate that a well productivity may occur for subsequent wells and that the second well as represented in graph 1902 may provide the most productivity. In this manner, the results of the cluster analysis made using the different embodiments of the present invention may be used to predict the makeup or properties within other wells. This type of cluster tagging may be performed without requiring all of the same analysis performed with the reference well. With this information, samples or tests may be made in the appropriate predicted cluster units to verify the results.

Figure 20:
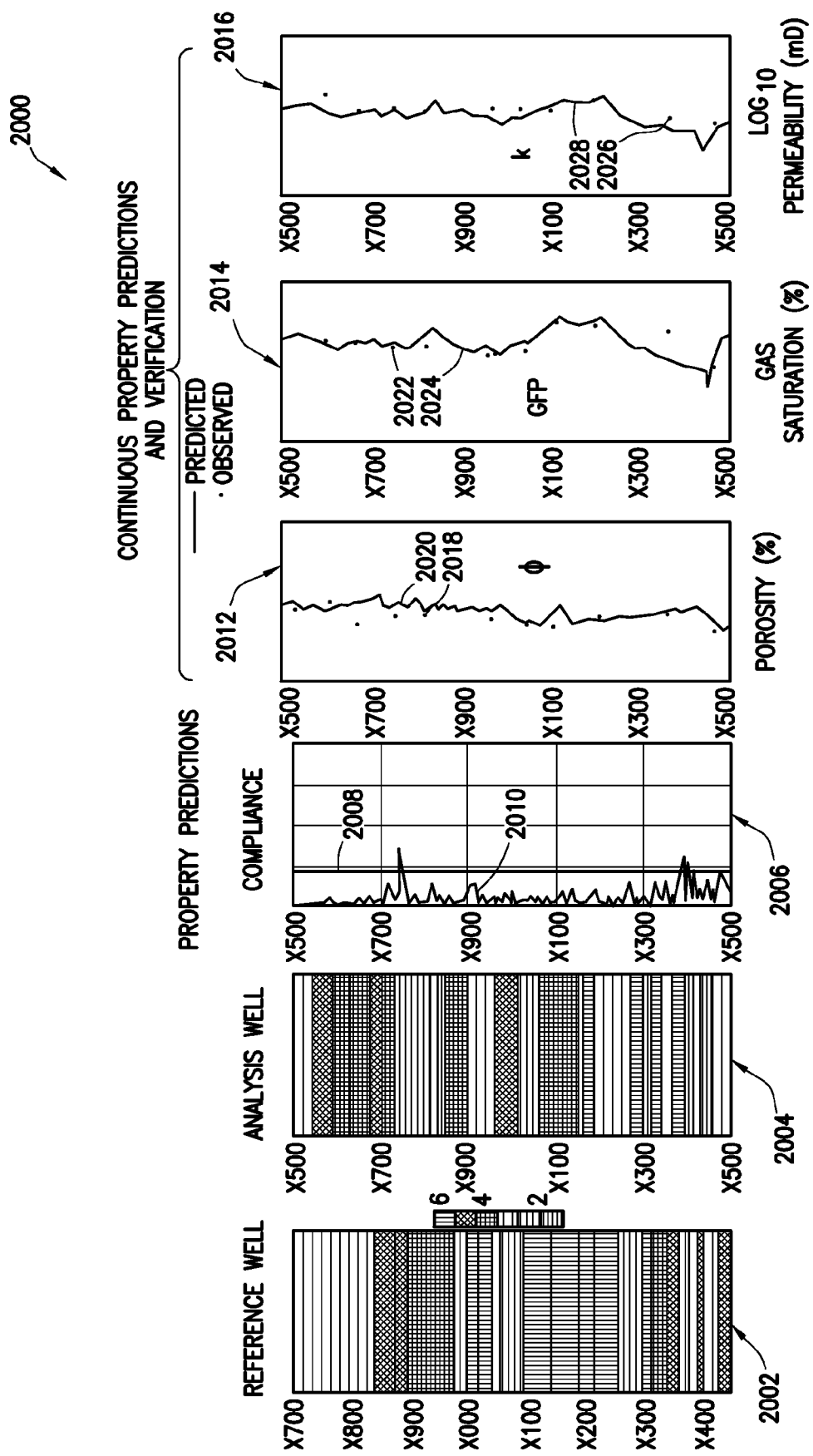
FIG. 20 is a diagram illustrating cluster tagging and confirming data in accordance with a preferred embodiment of the present invention.

Turning now to FIG. 20, a diagram illustrating cluster tagging and confirming data is depicted in accordance with a preferred embodiment of the present invention. This figure shows an application of cluster tagging in which good compliance is present to the definitions for the cluster types in the reference well. This figure also shows good property predictions for the cluster types when comparisons are made to subsequent measured laboratory data.

In this example, display 2000 includes results from a reference well at a reference well site in which complete analysis has been performed using the different embodiments of the present invention in graph 2002. Graph 2004 illustrates results from performing cluster tagging on analysis well at an analysis well site. Graph 2006 in display 2000 indicates how close the log data from the reference well site is to the analysis well. The threshold or acceptable limit for data is indicated using line 2008. Line 2010 is a compliance or error curve to provide a quantitative measurement between the degree of similarity between the clusters and the reference well and the new well site. When the error curve is below the acceptable limit indicated by line 2010 the compliance is considered to be high enough to provide a high quality reliable prediction when applied to the new well. Graphs 2012, 2014, and 2016 show predictions for parameters, such as porosity, gas saturation, and permeability. Samples from the different levels or regions may be taken to confirm the predictions. In this manner, predictions of measured properties, such as reservoir and mechanical, may be obtained quickly.

The visualization of these results facilitates the evaluation of large amounts and different types of data for use in generating decisions that may affect operations for a particular well site or formation. Further, although these examples present the results as a one dimensional color-coded display, the results may be presented using other display techniques. For example, the results may be presented using a two or three dimensional display and may use symbols in addition to or in place of the color coding in display 1300 in FIG. 13.

The example in display 2000 illustrates that the model for the reference well in graph 2002 is in high compliance. The high quality of this model for the reference well in graph 2000 is illustrated by graph 2006 in which most of the data points in line 2010 fall below the threshold for acceptable data in line 2008. Further, data points, such as data points 2018, 2020, 2022, 2024, 2026, and 2028 in graphs 2012, 2014, and 2016 indicate that the particular properties are close to those identified by the data points where the actual sampled properties. This ability for obtaining high quality predictions for properties of different regions in a formation in the ground may be obtained quickly with respect to the analysis for the reference well. This information can then be broadcast or transmitted to various locations for use in managing operations of the analysis or target well site as illustrated by the model in graph 2004.

Figure 21:
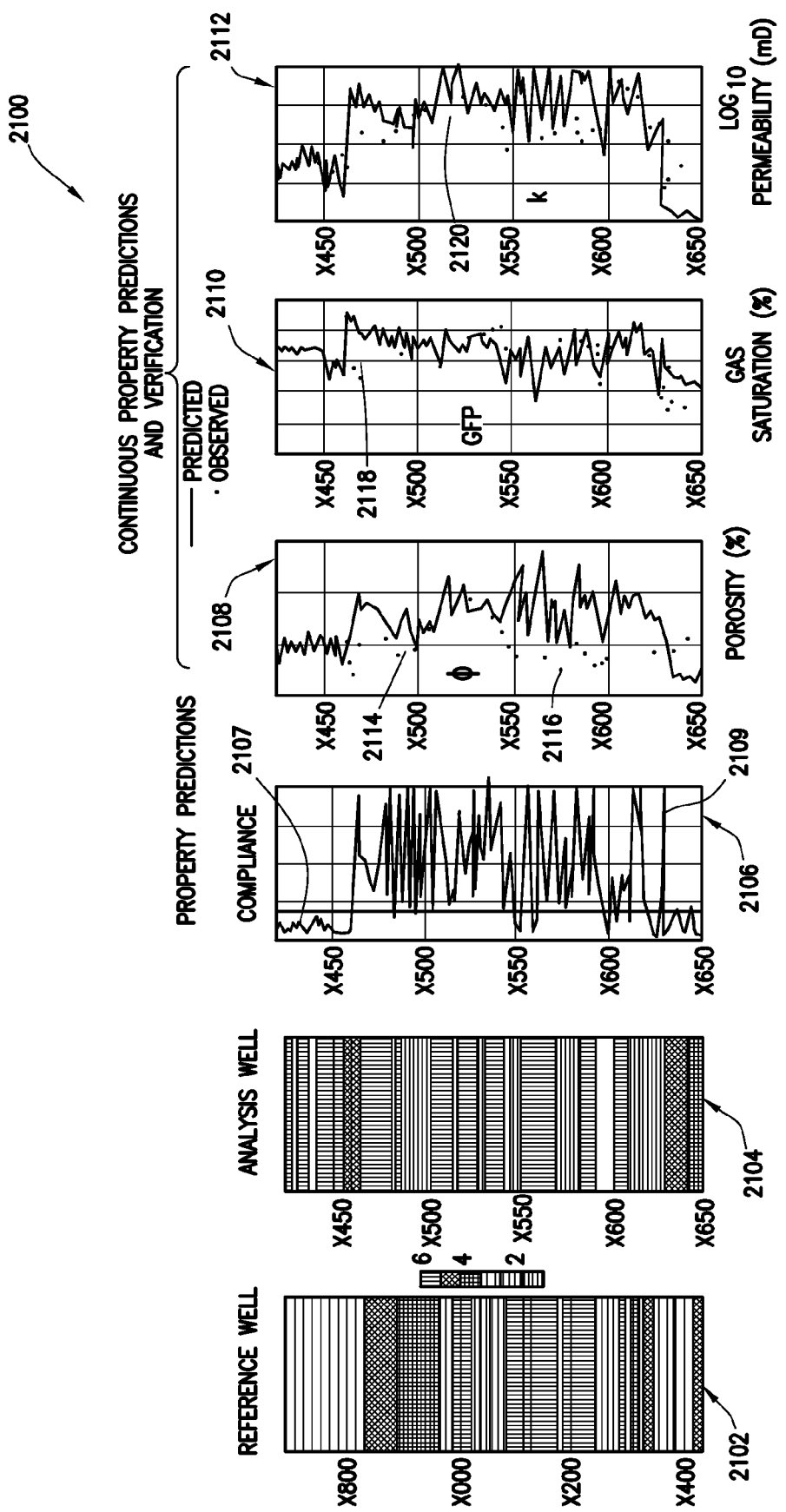
FIG. 21 is a diagram illustrating cluster tagging and confirming data in accordance with a preferred embodiment of the present invention.

Turning now to FIG. 21, a diagram illustrating cluster tagging and confirming data is depicted in accordance with a preferred embodiment of the present invention. This figure shows an application of cluster tagging in which poor compliance is present to the definitions for the cluster types in the reference well. This figure also shows poor property predictions for the cluster types when comparisons are made to subsequent measured laboratory data.

In this particular example, display 2100 includes results from a reference well site in graph 2102. A model generated through cluster tagging for an analysis well site is displayed in graph 2104. The quality of the model in graph 2102 is illustrated in graph 2106. This graph displays the compliance and error level between the predicted cluster units for graph 2104 and the actual properties for those different cluster units. Line 2107 in graph 2106 indicates a threshold level for line 2109, which is a compliance or error curve. The threshold identified by line 2107 indicates that the data in line 2109 is not acceptable in this example.

In this illustrative example, the compliance is poor as can be seen by the error curve shown in graph 2106. Graph 2108 illustrates porosity, graph 2110 shows gas saturation, and graph 2112 illustrates permeability. Samples have been taken at the different depths are illustrated by data points, such as, data points 2113, 2116, 2118, and 2120 in graphs 2108, 2110, and 2112. The samples taken at the different depths indicate that the error is high and that the compliance of the model is poor. As a result, the model in graph 2102 for the reference well is a poor model for predicting the different properties for different regions in the analysis well site. Thus, cluster tagging allows for a prediction to be made as to whether the predictions will be of a good quality.

Figure 22:
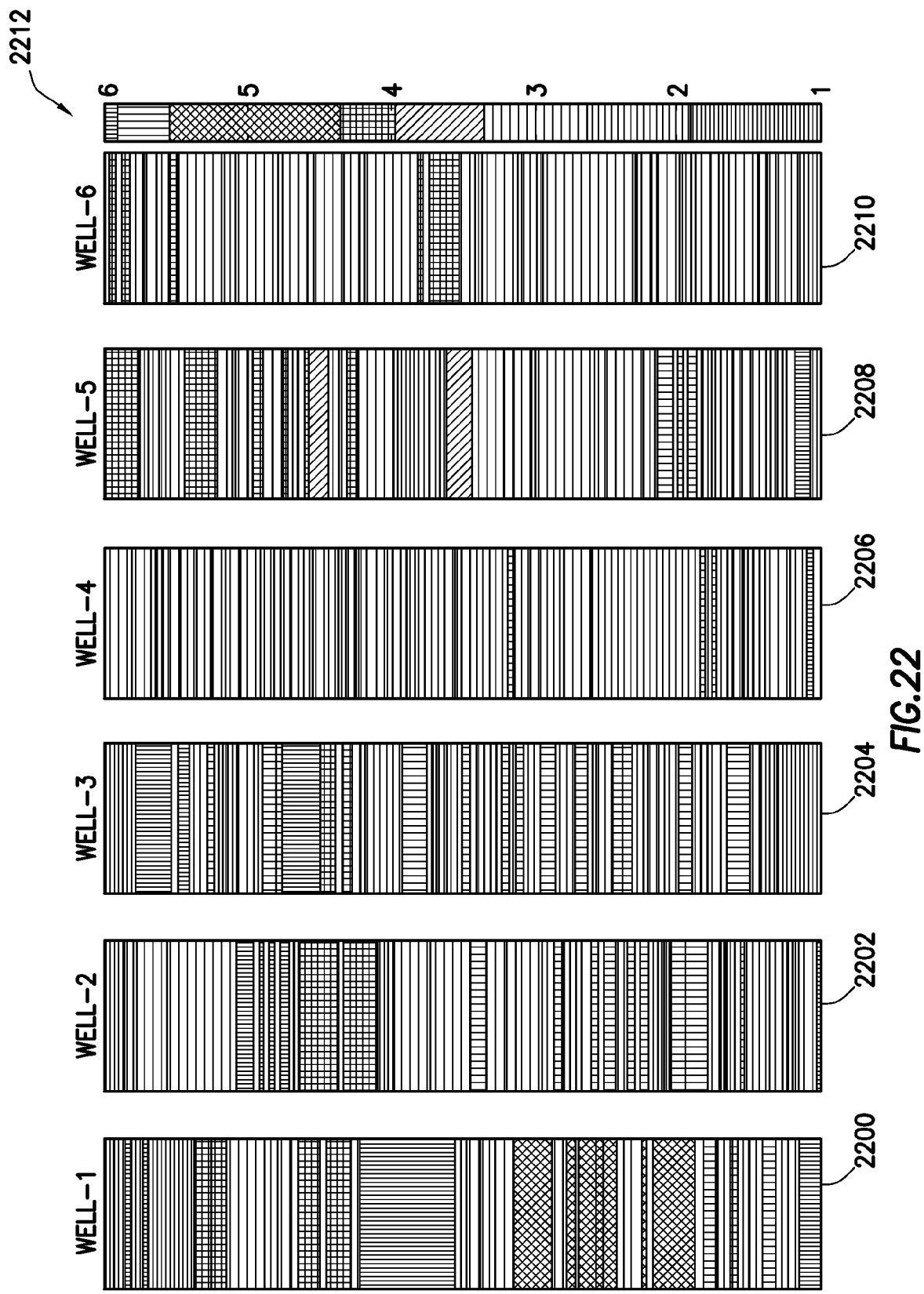
FIG. 22 is a diagram illustrating a display of models for well sites in a basin in accordance with a preferred embodiment of the present invention.

Turning now to FIG. 22, a diagram illustrating a display of models for well sites in a basin is depicted in accordance with a preferred embodiment of the present invention. In this example, graphs 2200, 2202, 2204, 2206, 2208, and 2210 in display 2212 are from models of well sites within a basin. These models may be generated based on the analysis as described above or through cluster tagging from a reference well. In this manner, these models provide the ability to sample and test at appropriate depths in the different well sites to verify the models accuracy. As can be seen in this example, in display 2212, the change in the stacking between various types of cluster units from well site to well site illustrates lateral heterogeneity. Further, with this information, monitoring an evaluation of this type of heterogeneity may be made. Seismic data may be used to interpolate the types of clusters that may be present in the ground between different wells. In this manner, three dimensional models may be generated representing the variability in material properties across a formation or field.

Figure 23:
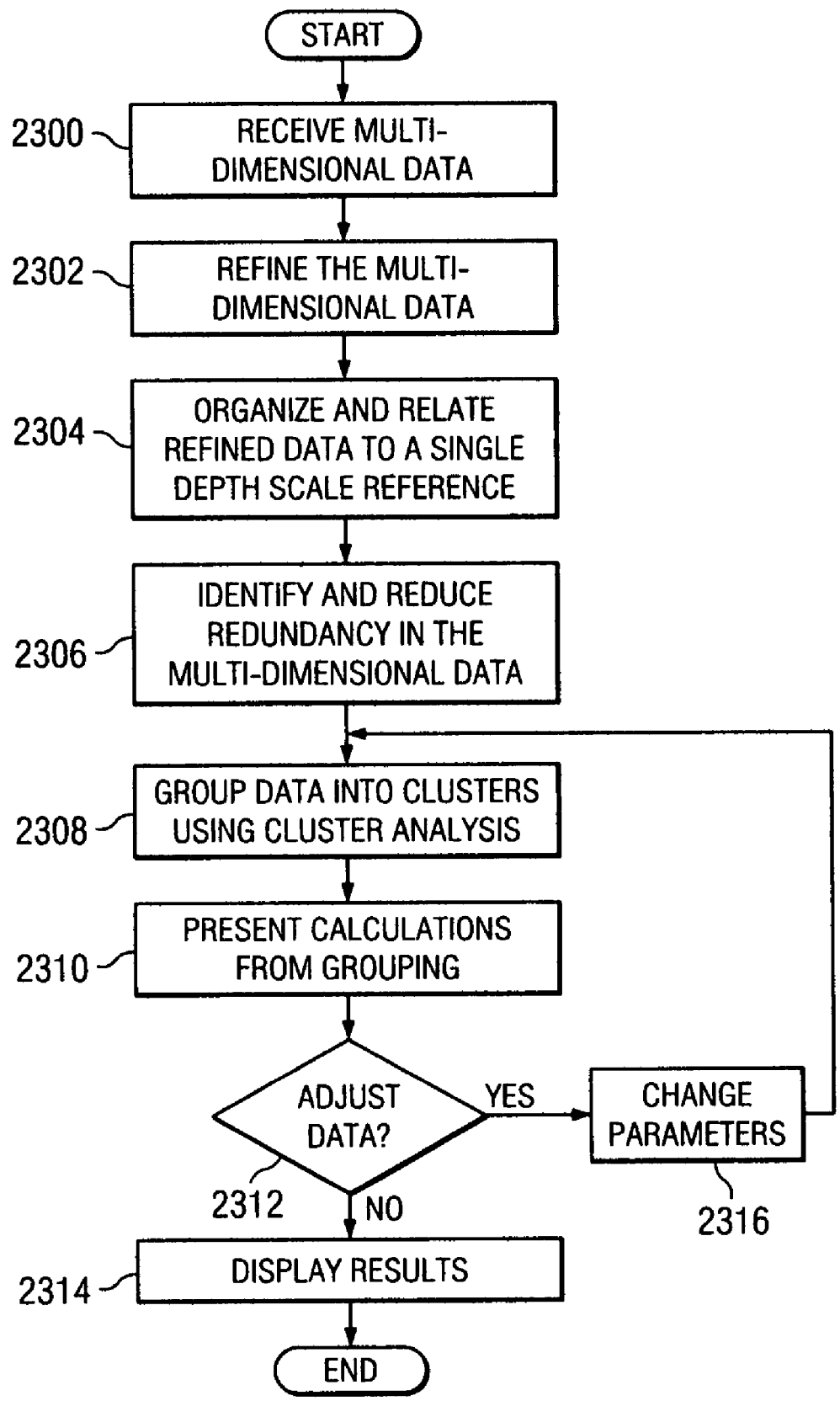
FIG. 23 is a flowchart of a process for performing multi-dimensional data analysis in accordance with a preferred embodiment of the present invention.

Turning next to FIG. 23, a flowchart of a process for performing multi-dimensional data analysis is depicted in accordance with a preferred embodiment of the present invention. In these examples, the process illustrated in FIG. 23 may be implemented in a software component, such as multi-dimensional analysis process 400 in FIG. 4.

The process begins by receiving multi-dimensional data (step 2300). Thereafter, the multi-dimensional data is refined (step 2302). In refining multi-dimensional data, filters or corrections may be applied to the data, such as logs. Further, the data may be standardized in this step. This step includes, for example, applying environmental corrections to logs. For example, gamma ray measurements are affected by wellbore diameters. The gamma ray logs may be adjusted based on the wellbore diameters. As another example, neutron porosity is collected by the fluid. Drilling mud used is taken into account to remove artificial influences on neutron porosity as another example of applying environmental corrections to logs.

Different sections of logs may be filtered to take out bad behavior. As an example, some logs are influenced or contain washouts caused by hole enlargements. The data in this area is considered unreliable. The editing may be made to remove the unreliable data. Further, these sections may be edited to predict the data that should be present in those sections with bad behavior. Correction of data also may include removing spikes in data that are anomalies or considered to be noise.

Other data refinement includes conducting geometric scaling of relationships, such as core-to-log, and log-to-seismic when necessary. Frequency scaling relationships also may be performed on core-to-log and log-to-seismic when necessary. This refinement of data also may include depth corrections. For example, the core depth to the log depth may be corrected as well as the measured depth to the vertical depth. In other words, step 2302 is used to place the data in a format for analysis.

Thereafter, the refined data is organized and related to a single depth for scale reference (step 2304). The process then performs an analysis to identify and reduce redundancy in a multi-dimensional data (step 2306). This step involves identifying the number of non-redundant data sets as well as the number of redundant data sets present in the multi-dimensional data. Further, step 2306 includes identifying principal components for use in the multi-dimensional analysis. In the depicted embodiments, step 2306 is implemented using principal component analysis to capture redundancy in the multi-dimensional data. Step 2306 is used in the depicted examples, but may be skipped depending on the implementation.

Next, the process groups the data into clusters using cluster analysis on parameters or components (step 2308). In step 2308, the grouping is made by grouping the principal components into the clusters. Calculations from the grouping are presented (step 2310). The presentation of the groupings in step 2310 may involve generating a display, such as display 1000 in FIG. 10 and display 1100 in FIG. 11. A determination is then made as to whether the data should be adjusted (step 2312). The determination in step 2312 may be made by user input after viewing results presented in step 2310. Alternatively, the process may make that determination based on various thresholds that have been set for acceptable groupings.

If the data should not be adjusted then the results are displayed (step 2314) with the process terminating thereafter. The display in 2314 is similar to display 1300 in FIG. 13 in these examples. With reference again to step 2312, if the data is to be adjusted, then parameters are changed (step 2316) with the process then returning to step 2308.

Figure 24:
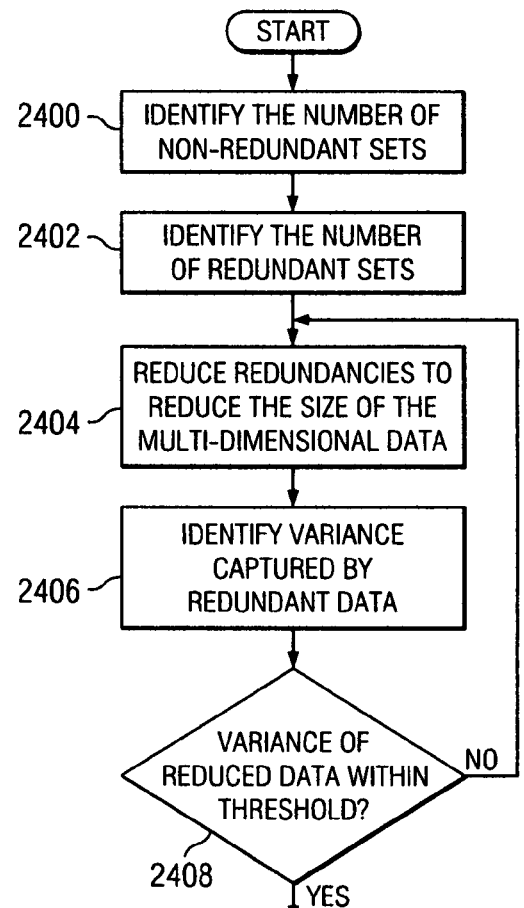
FIG. 24 is a flowchart of a process for identifying redundancies in multi-dimensional data in accordance with a preferred embodiment of the present invention.

With reference next to FIG. 24, a flowchart of a process for identifying redundancies in multi-dimensional data is depicted in accordance with a preferred embodiment of the present invention. The process illustrated in FIG. 24 is a more detailed description of step 2306 in FIG. 23.

The process begins by identifying the number of non-redundant sets of data in the multi-dimensional data (step 2400). The number of redundant sets of data in the multi-dimensional data is identified (step 2402). In some cases, the number of redundant sets identified in step 2402 may be none. In that case, no further steps are needed to reduce redundancy. On the other hand, if redundancy is present, the process then reduces the redundancies to reduce the size of the multi-dimensional data while preserving variance (step 2404). In these examples, step 2404 is performed using principal component analysis. Of course, other types of mechanisms may be used depending on the particular implementation. Thereafter, a variance is captured by the redundant data is identified (step 2406). This variance is for variability in the original data.

The variance of data from one data set is the variance of the data that occurs between the groupings for that data set. When two data sets representing two variables are reduced to a single non-redundant principal component, the variability of the original data is preserved in the variance of this principal component. The variance of a data set is subdivided into smaller ranges for each cluster that is formed during the cluster analysis.

A determination is made as to whether the variance of the reduced data is within a threshold (step 2408). In these examples, an optimal solution is when the reduced data represents at least 90 percent of the variance of the original data. If the variance is within the threshold in step 24080, the process terminates with the remaining data being the principal components of the original data. Otherwise, the process returns to step 2404 to further reduce the redundant data. The resulting data is non-redundant and will typically have lower numbers of data sets. For example, a set of twenty-five different measurements along the length of a wellbore may be reduces to an equivalent non-redundant set with only ten continuous measurements.

Figure 25:
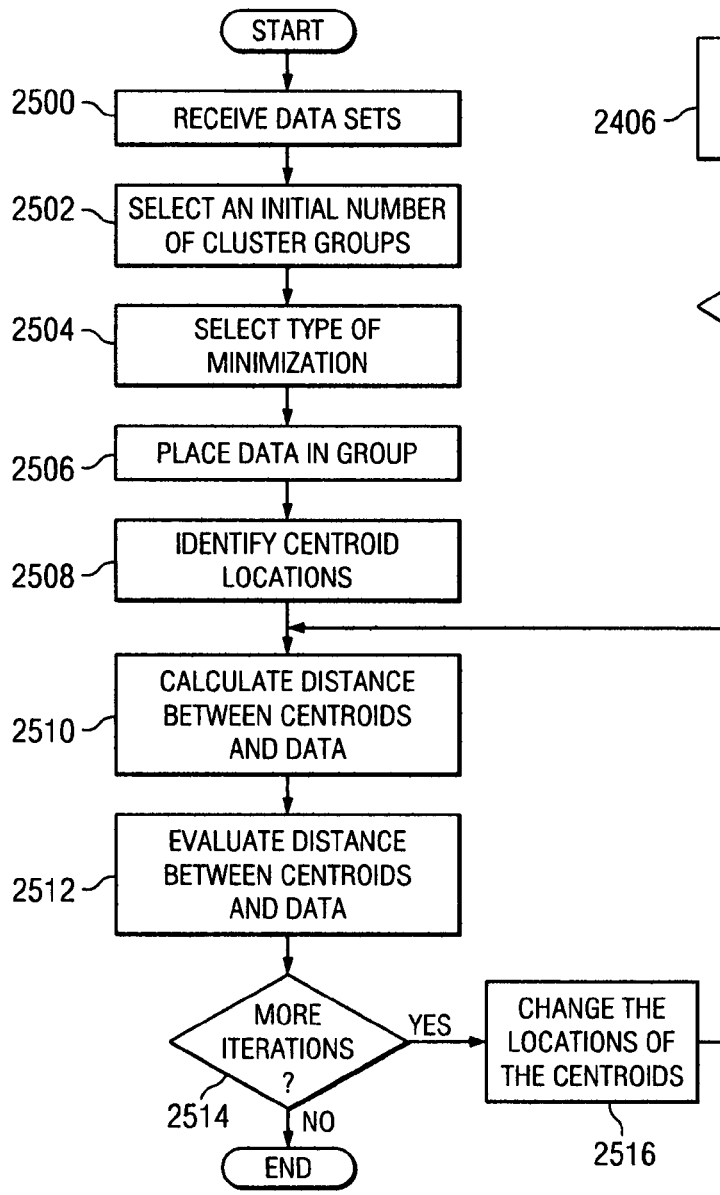
FIG. 25 is a flowchart of a process for performing cluster analysis in accordance with a preferred embodiment of the present invention

Turing now to FIG. 25, a flowchart of a process for performing cluster analysis is depicted in accordance with a preferred embodiment of the present invention. The process illustrated in FIG. 25 may be implemented in a multi-dimensional analysis process, such as multi-dimensional analysis process 400 in FIG. 4. The process illustrated in FIG. 25 is a more detailed description of a portion of step 2308 in FIG. 23.

The process begins by receiving data sets (step 2500). These data sets may be the initial data sets in the multivariate data or a reduced data set which one or more principal components have been identified from the multivariate data. This data forms the input data for the cluster analysis. Thereafter, an initial number of cluster groups are selected (step 2502). This number of cluster groups may be selected based on user input or some default value depending on the implementation. Thereafter, the type of minimization is selected (step 2504). The type of minimization may be, for example, squared Euclidean or city-block cluster analysis places objects into clusters or groups. In these examples, the type of minimization selected differs based on how outliers are handled. An outlier is an observation or point that is far away from the rest of the data. Next, the data is separated or placed into these groups based on the distance of the nearest centroid (step 2506). Step 2506 forms grouped data that is used in the cluster analysis. When data sets are reduced to decrease redundancy, these data sets are placed in groups in a manner in which the entire data set is present for a group. In grouping data, all of the data the depth for the relevant zone of interest is used. The depth data is used later after the cluster analysis has been performed. In these examples, each data point in the group of data is plotted a multi-dimensional Cartesian space, such as using an X axis, a Y axis, and a Z axis. More axes may be used depending on the implementation. Thereafter, centroid locations are identified (step 2508). The location for a set of centroids is made for the different data groupings. A set of centroids is one or more centroids in these examples. More than one centroid is used in the different embodiments. These may be selected or modified based on user input or automatically selected by the process.

Next, the distance between the centroids and the data points associated with the centroids are calculated (step 2510). In step 2510, the process uses a K-Means algorithm to minimize the distance between the clusters. This algorithm assigns each data point to the centroid nearest to the data point. The center or centroid is the average of all the points in the cluster. This function has an objective to minimize the total inter-cluster variance for the squared error function as follows:

$$V = \sum_{i=1}^{k} \sum_{x_j \in S_i} |x_j - \mu_i|^2$$

where there are k clusters $S_i$, i=1, 2, . . . , k and $\mu i$ is the centroid or mean point of all the points $\chi_j \in S_i$.

Then, the distance between the centroids and the data are evaluated (step 2512). When selected by the process, the centroids are moved with each iteration to minimize the distance between the centroids and the data points.

Thereafter, the determination is made as to whether additional iterations are required (step 2514). The determination in step 2514 may be made by the process based on using some threshold value or parameter or through user input. If more iterations are needed, the process then minimizes the distance by changing the location of the centroid (step 2516). Otherwise, the process terminates. In these examples, steps 2508-2516 are examples of steps implementing a K-Means algorithm. Of course, depending on the implementation, other types of clustering algorithms may be used to perform the clustering analysis.

From step 2316, the process then returns to step 2510 to evaluate the new positions of the centroids with respect to the data points. The number of iterations performed by the process in FIG. 25 varies depending on the implementation. For example, the decision made in step 2514 may be to proceed to step 2516 until 50 iterations have occurred. The number iteration may be preset or based on meeting some threshold, such as a minimum distance.

Figure 26:
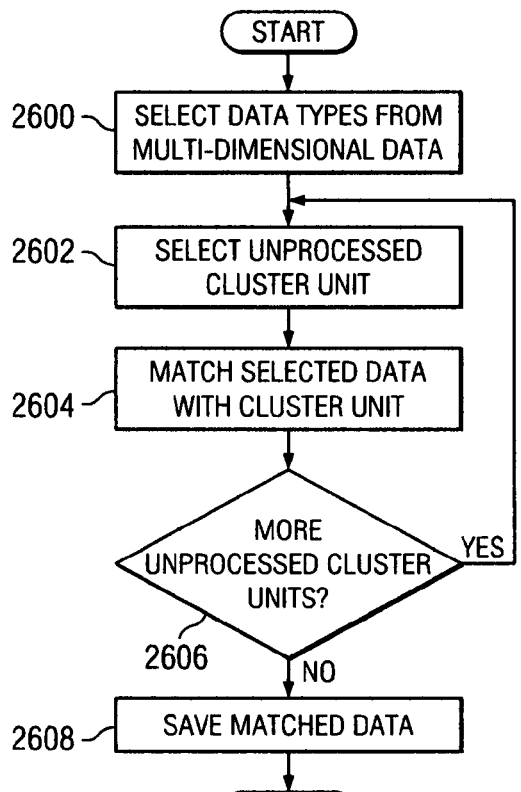
FIG. 26 is a flowchart of a process for correlating data for use in cluster tagging in accordance with a preferred embodiment of the present invention.

With reference now to FIG. 26, a flowchart of a process for correlating data for use in cluster tagging is depicted in accordance with a preferred embodiment of the present invention. The process illustrated in FIG. 26 may be implemented in a software component, such as multi-dimensional analysis process 400 in FIG. 4. This process is used to match data with cluster units in a model for a reference well in which analysis has been performed.

The process begins by selecting data types from multi-dimensional data (step 2600). In these examples, some or all of the different types of data in the multi-dimensional data set for the reference well may be selected for use. The types selected depend on the particular implementation. In these examples, continuous data, such as logs are used.

An unprocessed cluster unit is selected from a model (step 2602). The selected data is matched with the cluster unit that has been selected (step 2604). Step 2604 may be implemented, in these examples, by identifying the portions of the selected data types that match the cluster unit at the depths at which the cluster unit is found. Thereafter, a determination is made as to whether additional unprocessed cluster units are present (step 2606). If additional unprocessed cluster units are present, the process returns to step 2602, otherwise, the matched data is saved (step 2608) with the process terminating thereafter. In the cluster analysis performed by the process in FIG. 26, a technique called "discriminant analysis" is used by the process to assign to match data to a target well in identifying cluster units in the target well. Other embodiments, however, may use other numerous techniques for classification. Classification is another name for techniques that may be used for cluster tagging.

Figure 27:
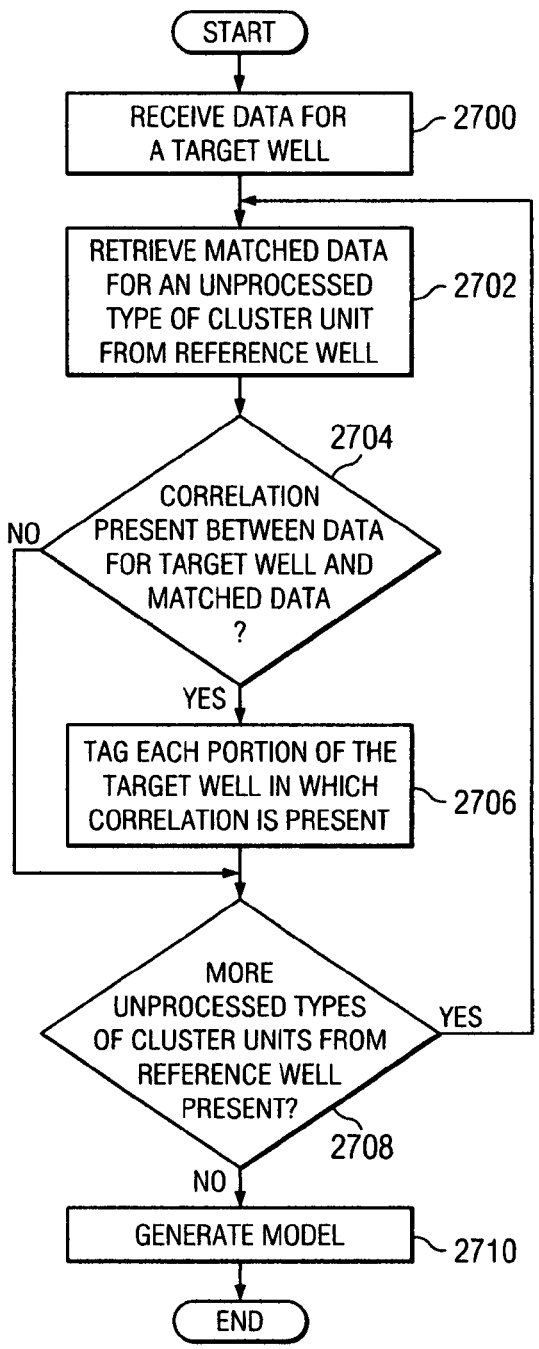
FIG. 27 is a flowchart of a process for generating a model in accordance with a preferred embodiment of the present invention.

Turning now to FIG. 27, a flowchart of a process for generating a model is depicted in accordance with a preferred embodiment of the present invention. The process depicted in FIG. 27 may be implemented in a software component, such as multi-dimensional analysis process 400 in FIG. 4. This process is used to model other wells in a formation using data from the reference well on which a cluster analysis has been performed. This process allows for modeling of other wells without performing all of the analysis used for the reference well. For example, the cluster analysis and the identification of properties after cluster units have been identified do not have to be performed for target wells. In this example, steps 2600-2608 are used to perform cluster tagging with step 2610 being used to generate the model from the results of cluster tagging.

The process begins by retrieving data for a target well (step 2700). The data retrieved for the target well in step 2700 is the same type of data used to match cluster types in FIG. 26.

Thereafter, matched data for an unprocessed type of cluster unit from the reference well is retrieved (step 2702). This matched data is generated from a process illustrated in FIG. 26. Thereafter, a determination is made as to whether a correlation is present between data for a target well and the matched data (step 2704). In other words, this matched data is data that provides a definition of a type of cluster in the reference well. This data is compared to similar data for the target well to determine whether the data at a particular depth for the target well has the same cluster type as the cluster type for the matched data. In these examples, a correlation may be present if an identical match is present. A correlation also may be present even though an identical match between the data for the reference well for the particular cluster type does not match that for the target well. Different currently available statistical techniques may be used to determine when a correlation is present in step 2704.

In other words, in step 2704, a comparison between the multi-dimensional data of the reference well is made with the multi-dimensional data of the target well. More specifically, the multi-dimensional data associated with an identified cluster type in the reference well is compared to multi-dimensional data for the target well to determine whether a correlation is present such that the type of cluster unit present in the reference well is considered to be present in one or more depths for the target well. This correlation is also referred to as a degree of fit or compliance. When the compliance is acceptable, then the corresponding portion of the target well is accepted as having the similar type of cluster unit. When the compliance is large or considered unacceptable, the section is flagged and represents a different cluster unit that is not of a type present in the reference well. In other words, the target well may contain a type of cluster unit that is not present in the reference well.

If a correlation is present, the process tags each portion of the target well in which the correlation is present step 2706. Thereafter, a determination is made as to whether additional types of cluster units from the reference well are present that have not been processed (step 2708). If additional unprocessed types of cluster units are present from the reference well, the process returns to step 2702. Otherwise, a model of the target well is generated (step 2710) with the process terminating thereafter. In creating the model in step 2710, the identified cluster units are used to generate a model containing colors that identify cluster types for cluster units at different depths. Depending on the comparison of the data in step 2704, the target well may contain a cluster type that is not present in the reference well. This cluster type may be identified with the color, but properties of the cluster type cannot be predicted as accurately because no corresponding cluster type is present in the reference well.

In these examples, the model generated in step 2710 is generated from the identification of cluster definitions for the target well. The model contains the continuous or predicted properties for the target well based on those models developed for the reference well. This step is performed by applying the models defined at the cluster level to the results from cluster tagging. The model generated in step 2708 may take the form of graph 1600 in FIG. 16. This type of model is created using the results, such as those shown in graph 1902 or 1904 in FIG. 19.

With reference again to step 2704, if a correlation between the data for the target well and the matched data are not present the process proceeds to step 2708 as described above. With the model generated in FIG. 27, corresponding sampling and laboratory testing may be conducted to verify the cluster types. Further, sampling and testing may be used to identify a new type of cluster present in the target well that is not found in the reference well. This new identification may then be used for subsequent cluster tagging of other wells or areas that are of interest. Depending of the implementation, the model may only include an identification of the different types of cluster units without actually including the properties of each type of cluster unit. Thus, the information provided in the different models in these illustrative embodiments may differ depending on the particular implementation.

In this manner, many wells for well sites may be modeled without requiring all of the analysis made for a reference well. These models then can be used to identify depths at which samples may be taken to verify the accuracy of the models. With this information, the results may be made available to different well sites corresponding to the models for use in facilitating decision making and affecting well site operations. This information may be used at particular well sites for performing coring or sidewall plugging or for collection of any type of sampling from specific depth locations identified through the models. Further, the information containing the analysis of the reservoir may be used to identify the portion of the formation with the best reservoir quality of best completion quality. This information may then be used to initiate well operations, such as hydraulic fracturing or perforating through a particular zone.

Further, seismic data also may be used in the multi-dimensional data to interpolate cluster definitions between wells. In this manner, the identification of different regions may be identified through interpolate of the data for reference and target wells for which models have been generated. A three dimensional representation of a formation may be made through the data collected from the different wells and the prediction made about the regions between the wells.

Figure 28:
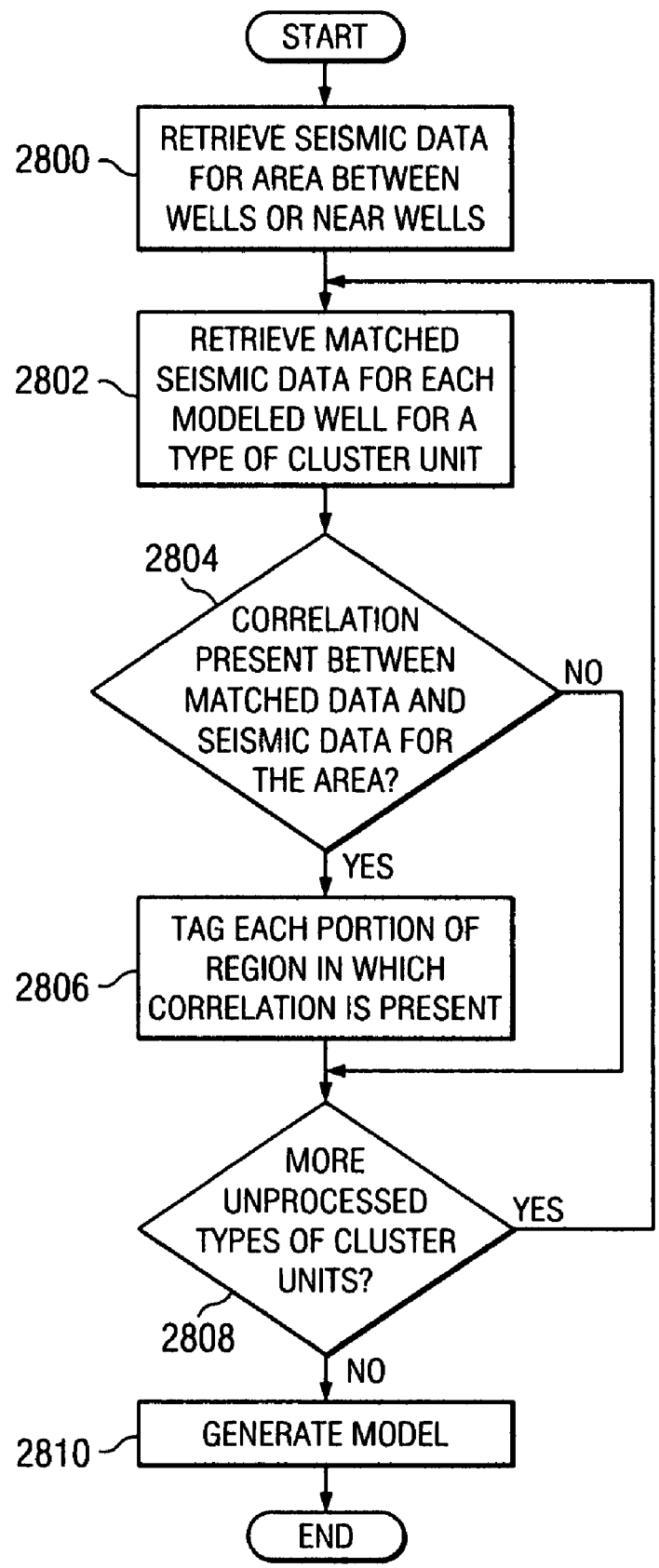
FIG. 28 is a flowchart of a process for predicting cluster units in areas between wells in accordance with a preferred embodiment of the present invention.

Turning now to FIG. 28, a flowchart of a process for predicting cluster units in areas between wells is depicted in accordance with a preferred embodiment of the present invention. The process illustrated in FIG. 28 may be implemented in a software component, such as multi-dimensional analysis process 400 in FIG. 4. The process in this figure may be used to predict cluster units that may be present near a modeled well site or between modeled well sites using seismic data. In this manner, a model of a reservoir or area of land may be made in which cluster units may be identified.

The process begins by retrieving seismic data for an area between wells or near a well (step 2800). Thereafter, matched seismic data is retrieved for each modeled well for a type of cluster unit (step 2802). The seismic data in step 2802 may be generated using the process depicted in FIG. 26. Thereafter, a determination is made as to whether a correlation is present between a matched seismic data and the seismic data for the area of interest (step 2804). The determination of whether a correlation is present may be made using various currently available statistical techniques.

If a correlation is present, the depths at which the correlations are present for the selected type of cluster unit are tagged or marked as having that type of cluster (step 2806). Thereafter, a determination is made as to whether additional unprocessed types of cluster units are present (step 2808). If additional unprocessed types of cluster units are present, the process returns to step 2802. Otherwise, a model is generated using the results (step 2810) with the process terminating thereafter. With reference again to step 2804, if a correlation is not present between the matched seismic data and the seismic data for the area of interest, the process proceeds to step 2808 as described above.

Figure 29:
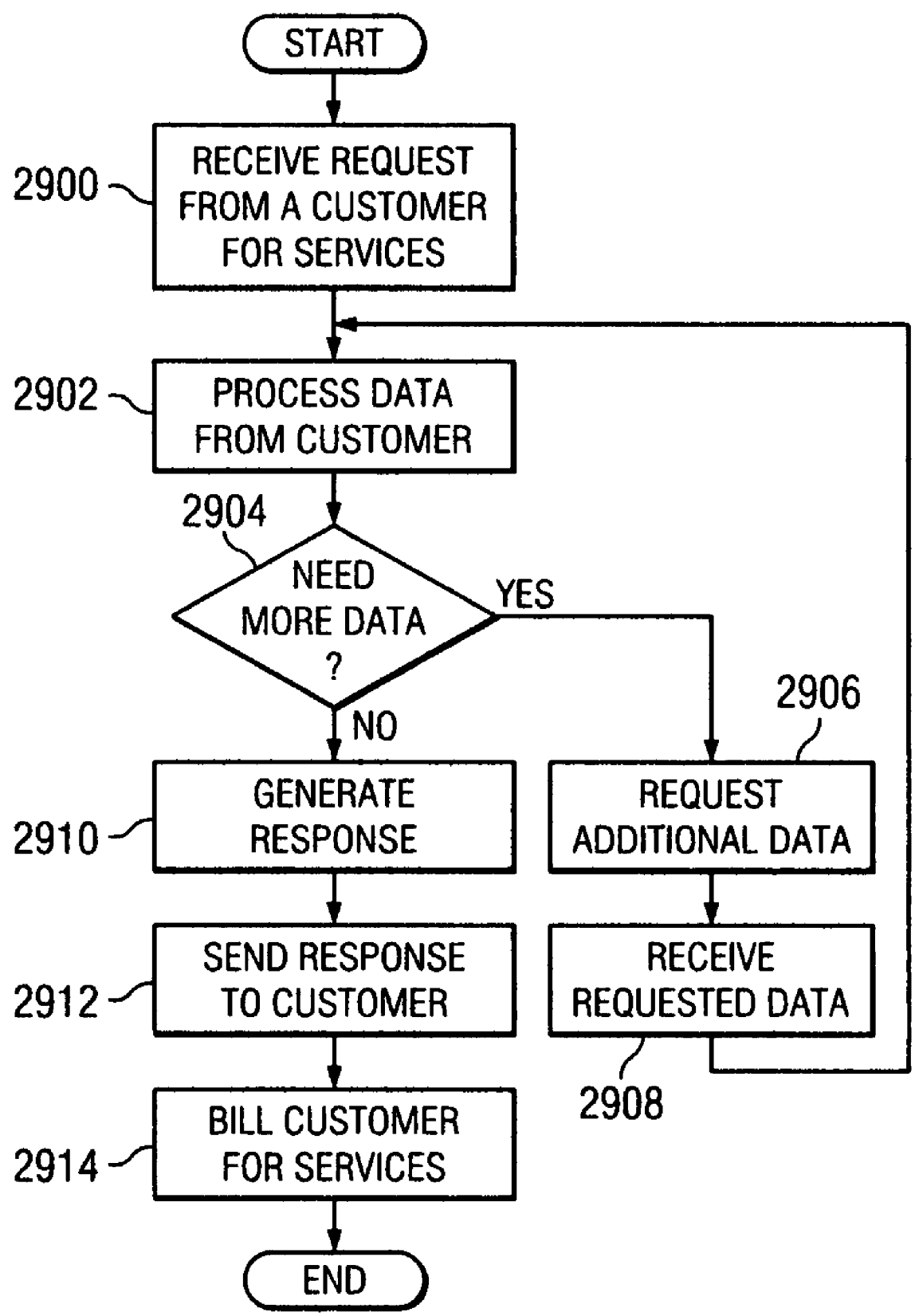
FIG. 29 is a flowchart of a process for handling requests from customers for multi-dimensional data analysis services in accordance with a preferred embodiment of the present invention.

With reference next to FIG. 29, a flowchart of a process for handling requests from customers for multi-dimensional data analysis services is depicted in accordance with a preferred embodiment of the present invention. The process illustrated in FIG. 29 is used to provide services to customers in which multi-dimensional data analysis is performed to identity rock heterogeneity. These services may be provided using software, such as multi-dimensional analysis process 400 in FIG. 4.

The process begins by receiving a request from a customer for services (step 2900). This request may include multi-dimensional data. The request may be, for example, a request for a model of a well site, guidance for obtaining cores and sidewall plugs, guidance for managing a well site or for multiple wells in some geographic region. The process then proceeds to process the data received from the customer (step 2902). This processing of data may include various process illustrated in the flowcharts described above for multi-dimensional data analysis.

A determination is made as to whether more data is needed (step 2904). For example, if only continuous data is provided from a well site, other data such as discrete data, samples from the well site, or seismic data may be required to finish processing the request for the customer. If more data is needed, a request is sent to the customer for the additional data (step 2906). This data is received from the customer (step 2908) with the process then returning to step 2902 to process the additional data.

If additional data is not required from the customer, then a response is generated (step 2910). This response may take various forms depending on the request received from the customer. If the customer requests a model for the well, then a model, such as the model illustrated in section 1302 in display 1300 in FIG. 13 may be generated as a response. Another example of a response is graph 1400 in FIG. 14 in which recommendations of where core and sidewall plug samples may be collected. Depending on the implementation, the recommendation of sampling may be provided in the response in step 2910 without the graphical information identifying differences in layers. Another example of a response that may returned to a customer is graph 1600 in FIG. 16. Other responses that may be generated include advice as to how to manage a particular well site or set of wells without returning a model also may be created depending on the particular implementation or may include performing the recommended actions.

Thereafter, the response is sent to (or performed for) the customers (step 2912). The customer is then billed for the services (step 2914) with the process terminating thereafter. In this manner, the different embodiments used to perform multi-dimensional data analysis may be employed to provide services to customers in a manner that generates revenues for the entity performing the services.

Thus, the different embodiments of the present invention provide a method, apparatus, and computer usable program code for multi-dimensional data analysis. Multi-dimensional data is received from the well site. Responsive to receiving the multi-dimensional data, cluster analysis is performed using the data to form a set of cluster units. The set of cluster units identify differences between regions in the ground at the well site. This set of cluster units form a model that may be presented to a user to visualize the differences or heterogeneity of the regions in the ground below the well site. The properties of the different cluster units are then identified for the set of cluster units. This information may be used to make decisions regarding management of the well site.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Although the foregoing is provided for purposes of illustrating, explaining and describing certain embodiments of the invention in particular detail, modifications and adaptations to the described methods, systems and other embodiments will be apparent to those skilled in the art and may be made without departing from the scope or spirit of the invention.

What is claimed is:

1. A computer implemented method for identifying regions in a ground formation at a well site, the computer implemented method comprising:

receiving continuous data comprising seismic data from the well site and strength profile data;

reducing redundancies in the continuous data to form processed data;

performing, using a processor of a computer, a cluster analysis of heterogeneity in the ground formation using the processed data to form a set of cluster units, wherein each cluster unit of the set of cluster units is a different type of cluster unit that identifies differences between regions in the ground formation at the well site;

obtaining multi-dimensional data comprising discrete well site data for each type of cluster unit in the set of cluster units;

identifying properties for each type of cluster unit in the set of cluster units using the discrete well site data to form a model for the well site;

selecting sidewall plug locations for the set of cluster units in each of the regions of the ground formation based on the identified properties of each type of cluster unit, wherein the sidewall plug locations are not at regular intervals;

obtaining a plurality of sidewall plugs from the sidewall plug locations in each of the regions along a length of a wellbore in the ground formation, wherein the plurality of sidewall plugs comprises at least one sidewall plug for each type of cluster unit in the set of cluster units; and verifying compliance of the model with a threshold by comparing the identified properties along the length of the wellbore with measured properties of the plurality of sidewall plugs.

2. The computer implemented method of claim 1, wherein the performing step comprises:

selecting a number of cluster groups for the processed data;

grouping the processed data into the number of cluster groups to form grouped data;

selecting a set of centroid locations for the grouped data in the number of cluster groups;

evaluating distances between the set of centroid locations and the grouped data; and responsive to evaluating the distances, selectively changing the set of centroid locations to minimize the distances between the set of centroid locations and the grouped data.

3. The computer implemented method of claim 2, wherein the multi-dimensional data further comprises at least one of continuous well site data, continuous laboratory data, and discrete laboratory data.

4. The computer implemented method of claim 2 further comprising:

obtaining additional multi-dimensional data from a target well; and performing cluster tagging to create a second model for the target well using the additional multi-dimensional data, the model with identified properties, and the multi-dimensional data for the well site.

5. The computer implemented method of claim 2 further comprising:

generating one or more recommendations regarding operation of the well site using the properties identified for the each cluster unit in the set of cluster units.

6. The computer implemented method of claim 5 further comprising:

implementing at least one of the generated recommendations.

7. A method for multi-dimensional data analysis for a well site, the method comprising:

receiving multi-dimensional data comprising seismic data from the well site and strength profile data;

responsive to receiving the multi-dimensional data, performing, using a processor of a computer, a cluster analysis of heterogeneity in a ground formation of the well site using the seismic data and strength profile data to form a set of cluster units, wherein each cluster unit of the set of cluster units is a different type of cluster unit that identifies differences between regions in the ground formation at the well site;

obtaining discrete well site data for each type of cluster unit in the set of cluster units;

identifying properties for each type of cluster unit in the set of cluster units using the discrete well site data to form a model for the well site;

selecting sidewall plug locations for the set of cluster units in each of the regions of the ground formation based on the identified properties of each type of cluster unit, wherein the sidewall plug locations are not at regular intervals;

obtaining a plurality of sidewall plugs from the sidewall plug locations in each of the regions along a length of a wellbore in the ground formation, wherein the plurality of sidewall plugs comprises at least one sidewall plug for each different type of cluster unit in the set of cluster units; and verifying compliance of the model with a threshold by comparing the identified properties along the length of the wellbore with measured properties of the plurality of sidewall plugs.

8. The method of claim 7 further comprising:

identifying each cluster unit in the set of cluster units using the multi-dimensional data from the well site.

9. The method of claim 7 further comprising:

presenting the set of cluster units in a color-coded display.

10. The method of claim 8, wherein the multi-dimensional data comprises continuous well site data, continuous laboratory data, discrete well site data, and discrete laboratory data.

11. The method of claim 7 further comprising:

refining the multi-dimensional data received from the well site before the performing step.

12. The method of claim 7 further comprising:

identifying a minimum number of data sets in the multi-dimensional data, wherein the minimum number of data sets reduces redundancy in the multi-dimensional data used in performing cluster analysis.

13. The method of claim 7, wherein the performing step comprises:

selecting a number of cluster groups for the multi-dimensional data;

grouping the multi-dimensional data into the number of cluster groups to form grouped data;

selecting a set of centroid locations for the grouped data in the number of cluster groups;

evaluating distances between the set of centroid locations and the grouped data; and responsive to evaluating the distances, selectively changing the set of centroid locations to minimize the distances between the set of centroid locations and the grouped data.

14. The method of claim 13 further comprising:
repeating the evaluating and selectively changing steps until a distance threshold is met to adequately represent variability of input variables in the grouped data.

15. The method of claim 13, wherein the cluster analysis is performed using a K-Means algorithm.

16. The method of claim 7, wherein the step of identifying the properties for each cluster unit in the set of cluster units further uses the multi-dimensional data from the well site.

17. The method of claim 7 further comprising:
matching the multi-dimensional data to the different types of cluster units in the set of cluster units.

18. The method of claim 17, wherein the well site is a reference well site and further comprising:
correlating the multi-dimensional data matched to the different types of cluster units in the set of cluster units for the reference well site to additional multi-dimensional data for a target well site, wherein a second model containing cluster units for the target well site is created.

19. The method of claim 7 further comprising:
relating all of the multi-dimensional data to a reference depth scale.

20. The method of claim 7, wherein the method is a computer implemented method.

21. The method of claim 7 further comprising:
generating decisions regarding operation of the well site using the properties identified for the each cluster unit in the set of cluster units.

22. The method of claim 7, wherein the multi-dimensional data includes a sidewall plug and further comprising:
obtaining a first core from the sidewall plug at a first orientation with respect to an axis for the sidewall plug; and
obtaining a second core from the sidewall plug at a second orientation with respect to an axis for the sidewall plug.

23. The method of claim 22 further comprising:
obtaining a third core from the sidewall plug at a third orientation with respect to an axis for the sidewall plug.

24. A method for well site analysis comprising:
receiving a request from a client to provide an analysis of a well site, wherein the request includes multi-dimensional data comprising seismic data obtained from the well site and strength profile data;
responsive to receiving the request, performing, using a processor of a computer, a cluster analysis of heterogeneity in a ground formation of the well site using the seismic data and strength profile data to form a set of cluster units, wherein each cluster unit of the set of cluster units identifies differences between regions in the ground formation at the well site;
obtaining discrete well site data for each type of cluster unit in the set of cluster units;
identifying properties for each type of cluster unit in the set of cluster units using the discrete well site data to form a model for the well site; and
sending results based on the cluster analysis to the client, wherein the client uses the results to:
select sidewall plug locations for the set of cluster units in each of the regions of the ground formation based on the identified properties, wherein the sidewall plug locations are not at regular intervals,
obtain a plurality of sidewall plugs from the sidewall plug locations in each of the regions along a length of a wellbore in the ground formation, wherein the plurality of sidewall plugs comprises at least one sidewall plug for each cluster unit of the set of cluster units, and
verify compliance of the model with a threshold by comparing the identified properties along the length of the wellbore with measured properties of the plurality of sidewall plugs.

25. The method of claim 24, wherein the results are a graphical model of the ground formation at the well site, and wherein the model includes the set of cluster.

26. The method of claim 24, wherein the results are instructions identifying the actions.

27. A method for obtaining samples from a sidewall plug obtained from a length of a wellbore, the method comprising:
performing, using a processor of a computer, a cluster analysis of heterogeneity using strength profile data overlaid on an image of the sidewall plug to form a set of cluster units, wherein each cluster unit of the set of cluster units identifies differences between regions of the sidewall plug;
obtaining discrete well site data for each type of cluster unit in the set of cluster units;
identifying a plurality of different orientations in each of the regions of the sidewall plug with respect to an axis through the sidewall plug using the discrete well site data;
obtaining a plurality of cores from the sidewall plug along the plurality of different orientations in each of the regions of the sidewall plug, wherein the plurality of cores from the sidewall plug comprises at least one core for each cluster unit of the set of cluster units; and
verifying compliance of the cluster analysis with a threshold by comparing the identified properties along the length of the wellbore with measured properties of the plurality of cores.

28. The method of claim 27, wherein the plurality of different orientations and the plurality of cores are three.

29. A nontransitory computer usable storage medium having computer usable program code for identifying regions in a ground formation at a well site, the computer usable program code being executable on a computer processor and comprising:
computer usable program code for receiving continuous data comprising seismic data from the well site and strength profile data;
computer usable program code for reducing redundancies in the continuous data to form processed data;
computer usable program code for performing, using a processor of a computer, a cluster analysis using the processed data to form a set of cluster units, wherein each cluster unit of the set of cluster units is a different type of cluster unit that identifies differences between regions in the ground formation at the well site;
computer usable program code for obtaining multi-dimensional data comprising discrete well site data for each type of cluster unit in the set of cluster units;
computer usable program code for identifying properties for each type of cluster unit in the set of cluster units using the discrete well site data to form a model for the well site;
computer usable program code for selecting sidewall plug locations for the set of cluster units in each of the regions of the ground formation based on the identified properties of each different type of cluster unit, wherein the sidewall plug locations are not at regular intervals;
computer usable program code for obtaining a plurality of sidewall plugs from the sidewall plug locations in each of the regions along a length of a wellbore in the ground formation, wherein the plurality of sidewall plugs comprises at least one sidewall plug for each different type of cluster unit in the set of cluster units; and computer usable program code for verifying compliance of the model with a threshold by comparing the identified properties along the length of the wellbore with measured properties of the plurality of sidewall plugs.

30. The nontransitory computer usable storage medium of claim 29, wherein the computer usable program code for performing cluster analysis using the processed data to form a set of cluster units, wherein the set of cluster units include different types of cluster units that identify differences between regions in the ground formation at the well site comprises:

computer usable program code for selecting a number of cluster groups for the processed data;

computer usable program code for grouping the processed data into the number of cluster groups to form grouped data;

computer usable program code for selecting a set of centroid locations for the grouped data in the number of cluster groups;

computer usable program code for evaluating distances between the set of centroid locations and the grouped data; and computer usable program code for responsive to evaluating the distances, selectively changing the set of centroid locations to minimize the distances between the set of centroid locations and the grouped data.

31. The nontransitory computer usable storage medium of claim 30, wherein the multi-dimensional data further comprises at least one of continuous well site data, continuous laboratory data, and discrete laboratory data.

32. The nontransitory computer usable storage medium of claim 30 further comprising:

computer usable program code for obtaining additional multi-dimensional data from a target well; and computer usable program code for performing cluster tagging to create a second model for the target well using the additional multi-dimensional data, the model with identified properties, and the multi-dimensional data for the well site.

33. A data processing system for identifying regions in a ground formation at a well site, the data processing system comprising:

receiving means for receiving continuous data comprising seismic data from the well site and strength profile data;

reducing means for reducing redundancies in the continuous data to form processed data;

performing means for performing a cluster analysis of heterogeneity in the ground formation using the processed data to form a set of cluster units, wherein each cluster unit of the set of cluster units is a different type of cluster unit that identifies differences between regions in the ground formation at the well site;

obtaining means for obtaining multi-dimensional data comprising discrete well site data for each type of cluster unit in the set of cluster units;

identifying means for identifying properties for each type of cluster unit in the set of cluster units using the discrete well site data to form a model for the well site;

first selecting means for selecting sidewall plug locations for the set of cluster units in each of the regions of the ground formation based on the identified properties of each different type of cluster unit, wherein the sidewall plug locations are not at regular intervals;

obtaining means for obtaining a plurality of sidewall plugs from the sidewall plug locations in each of the regions along a length of a wellbore in the ground formation, wherein the plurality of sidewall plugs comprises at least one sidewall plug for each different type of cluster unit in the set of cluster units; and verifying means for verifying compliance of the model with a threshold by comparing the identified properties along the length of the wellbore with measured properties of the plurality of sidewall plugs.

34. The data processing system of claim 33, wherein the performing comprises:

second selecting means for selecting a number of cluster groups for the processed data;

grouping means for grouping the processed data into the number of cluster groups to form grouped data;

third selecting means for selecting a set of centroid locations for the grouped data in the number of cluster groups;

evaluating means for evaluating distances between the set of centroid locations and the grouped data; and selectively changing means, responsive to evaluating the distances, for selectively changing the set of centroid locations to minimize the distances between the set of centroid locations and the grouped data.

35. The data processing system of claim 34, wherein the multi-dimensional data further comprises at least one of continuous well site data, continuous laboratory data, and discrete laboratory data.

36. The data processing system of claim 34 further comprising:

obtaining means for obtaining additional multi-dimensional data from a target well; and performing means for performing cluster tagging to create a second model for the target well using the additional multi-dimensional data, the model with identified properties, and the multi-dimensional data for the well site.

37. A data processing system comprising:

a bus;

a communications unit connected to the bus;

a storage device connected to the bus, wherein the storage device includes a set of computer usable program code; and a processor unit connected to the bus, wherein a processor in the processor unit executes the computer usable program code to:

receive continuous data comprising seismic data from the well site and strength profile data;

reduce redundancies in the continuous data to form processed data;

perform a cluster analysis of heterogeneity in a ground formation at the well site using the processed data to form a set of cluster units, wherein each cluster unit of the set of cluster units is a different type of cluster unit that identifies differences between regions in the ground formation at the well site;

obtain multi-dimensional data comprising discrete well site data for each type of cluster unit in the set of cluster units;

identify properties for each type of cluster unit in the set of cluster units using the discrete well site data to form a model for the well site;

select sidewall plug locations for the set of cluster units in each of the regions of the ground formation based on the identified properties of each type of cluster unit, wherein the sidewall plug locations are not at regular intervals;

obtain a plurality of sidewall plugs from the sidewall plug locations in each of the regions along a length of a wellbore in the ground formation, wherein the plurality of sidewall plugs comprises at least one sidewall plug for each type of cluster unit in the set of cluster units; and verify compliance of the model with a threshold by comparing the identified properties along the length of the wellbore with measured properties of the plurality of sidewall plugs.

38. The data processing system of claim 37, wherein in executing the computer usable program code to perform cluster analysis using the processed data to form a set of cluster units, wherein the set of cluster units include different types of cluster units that identify differences between regions in the ground formation at the well site, the processor unit executes the computer usable program code to select a number of cluster groups for the processed data; group the processed data into the number of cluster groups to form grouped data; select a set of centroid locations for the grouped data in the number of cluster groups; evaluate distances between the set of centroid locations and the grouped data; and selectively change the set of centroid locations to minimize the distances between the set of centroid locations and the grouped data in response to evaluating the distances.

39. The data processing system of claim 38, wherein the multi-dimensional data further comprises at least one of continuous well site data, continuous laboratory data, and discrete laboratory data.

40. The data processing system of claim 38 wherein the processor unit further executes the computer usable program code to obtain additional multi-dimensional data from a target well; and perform cluster tagging to create a second model for the target well using the additional multi-dimensional data, the model with identified properties, and the multi-dimensional data for the well site.

41. A nontransitory computer usable storage medium having computer usable program code for multi-dimensional data analysis for a well site, the computer usable program code being executable on a computer processor and comprising:

computer usable program code for receiving multi-dimensional data comprising seismic data from the well site and strength profile data;

computer usable program code, responsive to receiving the multi-dimensional data, for performing a cluster analysis of heterogeneity in the ground formation using the seismic data and strength profile data to form a set of cluster units, wherein each cluster unit of the set of cluster units is a different type of cluster unit that identifies differences between regions in the ground formation at the well site;

computer usable program code for obtaining discrete well site data for each type of cluster unit in the set of cluster units;

computer usable program code for identifying properties for each type of cluster unit in the set of cluster units using the discrete well site data to form a model for the well site;

computer usable program code for selecting sidewall plug locations for the set of cluster units in each of the regions of the ground formation based on the identified properties of each type of cluster unit, wherein the sidewall plug locations are not at regular intervals;

computer usable program code for obtaining a plurality of sidewall plugs from the core sidewall plug locations in each of the regions along a length of a wellbore in the ground formation, wherein the plurality of sidewall plugs comprises at least one sidewall plug for each type of cluster unit in the set of cluster units; and computer usable program code for verifying compliance of the model with a threshold by comparing the identified properties along the length of the wellbore with measured properties of the plurality of sidewall plugs.

42. The nontransitory computer usable storage medium of claim 41 further comprising:

computer usable program code for identifying each cluster unit in the set of cluster units using the multi-dimensional data from the well site.

43. The nontransitory computer usable storage medium of claim 41 further comprising:

computer usable program code for presenting the set of cluster units in a color-coded display.

44. The nontransitory computer usable storage medium of claim 42, wherein the multi-dimensional data comprises continuous well site data, continuous laboratory data, discrete well site data, and discrete laboratory data.

45. The nontransitory computer usable storage medium of claim 41 further comprising:

computer usable program code for refining the multi-dimensional data received from the well site before executing the computer usable program code for the performing cluster analysis using the multi-dimensional data to form a set of cluster units, wherein the different types of cluster units within the set of cluster units identify differences between regions in the ground formation at the well site.

46. The nontransitory computer usable storage medium of claim 41 further comprising:

computer usable program code for identifying a minimum number of data sets in the multi-dimensional data, wherein the minimum number of data sets reduces redundancy in the multi-dimensional data used in performing cluster analysis.

47. The nontransitory computer usable storage medium of claim 41, wherein the computer usable program code, responsive to receiving the multi-dimensional data, for performing cluster analysis using the multi-dimensional data to form a set of cluster units, and wherein the different types of cluster units within the set of cluster units identify differences between regions in the ground formation at the well site comprises:

computer usable program code for selecting a number of cluster groups for the multi-dimensional data;

computer usable program code for grouping the multi-dimensional data into the number of cluster groups to form grouped data;

computer usable program code for selecting a set of centroid locations for the grouped data in the number of cluster groups;

computer usable program code for evaluating distances between the set of centroid locations and the grouped data; and computer usable program code, responsive to evaluating the distances, for selectively changing the set of centroid locations to minimize the distances between the set of centroid locations and the grouped data.

48. The nontransitory computer usable storage medium of claim 47 further comprising:

computer usable program code for repeating execution of the computer usable program code for evaluating distances between the set of centroid locations and the grouped data and the computer usable program code for selectively changing the set of centroid locations to minimize the distances between the set of centroid locations and the grouped data until a distance threshold is met to adequately represent variability of input variables in the grouped data.

49. The nontransitory computer usable storage medium of claim 47, wherein the cluster analysis is performed using a K-Means algorithm.

50. The nontransitory computer usable storage medium of claim 41, wherein the computer usable program code for identifying the properties for each cluster unit in the set of cluster units further uses the multi-dimensional data from the well site.

51. The nontransitory computer usable storage medium of claim 41 further comprising:
computer usable program code for matching the multi-dimensional data to the different types of cluster units in the set of cluster units.

52. The nontransitory computer usable storage medium of claim 51, wherein the well site is a reference well site and further comprising:
computer usable program code for correlating the multi-dimensional data matched to the different types of cluster units in the set of cluster units for the reference well site to additional multi-dimensional data for a target well site, wherein a second model containing cluster units for the target well site is created.

53. The nontransitory computer usable storage medium of claim 41 further comprising:
computer usable program code for relating all of the multi-dimensional data to a reference depth scale.

54. The nontransitory computer usable storage medium of claim 41 further comprising:
computer usable program code for generating decisions regarding operation of the well site using the properties identified for the each cluster unit in the set of cluster units.

55. A data processing system for multi-dimensional data analysis for a well site, the data processing system comprising:
receiving means for receiving multi-dimensional data comprising seismic data from the well site and strength profile data;
performing means, responsive to receiving the multi-dimensional data, for performing a cluster analysis using the seismic data and strength profile data to form a set of cluster units, wherein each cluster unit of the set of cluster units is a different type of cluster unit that identifies differences between regions in a ground formation at the well site;
first obtaining means for obtaining discrete well site data for each type of cluster unit in the set of cluster units;
identifying means for identifying properties for each type of cluster unit in the set of cluster units using the discrete well site data to form a model for the well site;
first selecting means for selecting sidewall plug locations for the set of cluster units in each of the regions of the ground formation based on the different type of cluster unit for each cluster unit of the set of cluster units, wherein the sidewall plug locations are not at regular intervals;
second obtaining means for obtaining a plurality of sidewall plugs from the sidewall plug locations in each of the regions along a length of a wellbore in the ground formation, wherein the plurality of sidewall plugs comprises at least one sidewall plug for each different type of cluster unit in the set of cluster units; and
verifying means for verifying compliance of the model with a threshold by comparing the identified properties along the length of the wellbore with measured properties of the plurality of sidewall plugs.

56. The data processing system of claim 55 further comprising:
identifying means for identifying each cluster unit in the set of cluster units using the multi-dimensional data from the well site.

57. The data processing system of claim 55 further comprising:
presenting means for presenting the set of cluster units in a color-coded display.

58. The data processing system of claim 56, wherein the multi-dimensional data comprises continuous well site data, continuous laboratory data, discrete well site data, and discrete laboratory data.

59. The data processing system of claim 55 further comprising:
refining means for refining the multi-dimensional data received from the well site before initiating the performing means.

60. The data processing system of claim 55 further comprising:
identifying means for identifying a minimum number of data sets in the multi-dimensional data, wherein the minimum number of data sets reduces redundancy in the multi-dimensional data used in performing cluster analysis.

61. The data processing system of claim 5, wherein the performing means comprises:
second selecting means for selecting a number of cluster groups for the multi-dimensional data;
grouping means for grouping the multi-dimensional data into the number of cluster groups to form grouped data;
third selecting means for selecting a set of centroid locations for the grouped data in the number of cluster groups;
evaluating means for evaluating distances between the set of centroid locations and the grouped data; and
selectively changing means, responsive to evaluating the distances, for selectively changing the set of centroid locations to minimize the distances between the set of centroid locations and the grouped data.

62. The data processing system of claim 61 further comprising:
repeating means for repeating initiation of the evaluating means and selectively changing means until a distance threshold is met to adequately represent variability of input variables in the grouped data.

63. The data processing system of claim 61, wherein the cluster analysis is performed using a K-Means algorithm.

64. The data processing system of claim 55, wherein the properties are further identified using the multi-dimensional data from the well site.

65. The data processing system of claim 5 further comprising:
matching means for matching the multi-dimensional data to the different types of cluster units in the set of cluster units.

66. The data processing system of claim 65, wherein the well site is a reference well site and further comprising:
correlating means for correlating the multi-dimensional data matched to the different types of cluster units in the set of cluster units for the reference well site to additional multi-dimensional data for a target well site, wherein a second model containing cluster units for the target well site is created.

67. The data processing system of claim 55 further comprising:
relating means for relating all of the multi-dimensional data to a reference depth scale.

68. The data processing system of claim 55 further comprising:
generating means for generating decisions regarding operation of the well site using the properties identified for the each cluster unit in the set of cluster units.

69. A data processing system comprising:
a bus;
a communications unit connected to the bus;
a storage device connected to the bus, wherein the storage device includes a set of computer usable program code; and
a processor unit connected to the bus, wherein a processor in the processor unit executes the computer usable program code to:
receive multi-dimensional data comprising seismic data from the well site and strength profile data;
perform a cluster analysis of heterogeneity in a ground formation using the seismic data and strength profile data to form a set of cluster units in response to receiving the multi-dimensional data, wherein each cluster unit of the set of cluster units is a different type of cluster unit that identifies differences between regions in the ground formation at the well site;
obtain discrete well site data for each type of cluster unit in the set of cluster units;
identify properties for each type of cluster unit in the set of cluster units using the discrete well site data to form a model for the well site;
select sidewall plug locations for the set of cluster units in each of the regions of the ground formation based on the identified properties of each type of cluster unit, wherein the sidewall plug locations are not at regular intervals;
obtain a plurality of sidewall plugs from the sidewall plug locations in each of the regions along a length of a wellbore in the ground formation, wherein the plurality of sidewall plugs comprises at least one sidewall plug for each different type of cluster unit in the set of cluster units; and
verify compliance of the model with a threshold by comparing the identified properties along the length of the wellbore with measured properties of the plurality of sidewall plugs.

70. The data processing system of claim 69, wherein the processor unit further executes the computer usable program code to identify each cluster unit in the set of cluster units using the multi-dimensional data from the well site.

71. The data processing system of claim 69, wherein the processor unit further executes the computer usable program code to present the set of cluster units in a color-coded display.

72. The data processing system of claim 70, wherein the multi-dimensional data comprises continuous well site data, continuous laboratory data, discrete well site data, and discrete laboratory data.

73. The data processing system of claim 69, wherein the processor unit further executes the computer usable program code to refine the multi-dimensional data received from the well site before the performing step.

74. The data processing system of claim 69, wherein the processor unit further executes the computer usable program code to identify a minimum number of data sets in the multi-dimensional data, wherein the minimum number of data sets reduces redundancy in the multi-dimensional data used in performing cluster analysis.

75. The data processing system of claim 69, wherein in executing the computer usable program code to designate the target processor to perform cluster analysis using the multi-dimensional data to form a set of cluster units in response to receiving the multi-dimensional data, wherein the different types of cluster units within the set of cluster units identify differences between regions in the ground formation at the well site, the processor unit executes the computer usable program code to select a number of cluster groups for the multi-dimensional data; group the multi-dimensional data into the number of cluster groups to form grouped data; select a set of centroid locations for the grouped data in the number of cluster groups; evaluate distances between the set of centroid locations and the grouped data; and selectively change the set of centroid locations to minimize the distances between the set of centroid locations and the grouped data in response to evaluating the distances.

76. The data processing system of claim 75, wherein the processor unit further executes the computer usable program code to repeat evaluating distances between the set of centroid locations and the grouped data and selectively changing the set of centroid locations to minimize the distances between the set of centroid locations and the grouped data in response to evaluating the distances until a distance threshold is met to adequately represent variability of input variables in the grouped data.

77. The data processing system of claim 75, wherein the cluster analysis is performed using a K-Means algorithm.

78. The data processing system of claim 69, wherein the properties are further identified using the multi-dimensional data from the well site.

79. The data processing system of claim 69, wherein the processor unit further executes the computer usable program code to match the multi-dimensional data to the different types of cluster units in the set of cluster units.

80. The data processing system of claim 79, wherein the well site is a reference well site and wherein the processor unit further executes the computer usable program code to correlate the multi-dimensional data matched to the different types of cluster units in the set of cluster units for the reference well site to additional multi-dimensional data for a target well site, wherein a second model containing cluster units for the target well site is created.

81. The data processing system of claim 69, wherein the processor unit further executes the computer usable program code to relate all of the multi-dimensional data to a reference depth scale.

82. The data processing system of claim 69, wherein the processor unit further executes the computer usable program code to generate decisions regarding operation of the well site using the properties identified for the each cluster unit in the set of cluster units.

* * * * *